(12) United States Patent
Shi et al.

(10) Patent No.: US 10,591,348 B1
(45) Date of Patent: Mar. 17, 2020

(54) SYSTEM TO PROCESS LOAD CELL DATA USING DOOR SENSOR DATA

(71) Applicant: AMAZON TECHNOLOGIES, INC., Seattle, WA (US)

(72) Inventors: Qicai Shi, Bothell, WA (US); Nathan Pius O'Neill, Snohomish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 421 days.

(21) Appl. No.: 15/388,340

(22) Filed: Dec. 22, 2016

(51) Int. Cl.
| | |
|---|---|
| G01G 23/00 | (2006.01) |
| G06Q 10/08 | (2012.01) |
| G01G 19/414 | (2006.01) |
| A47F 3/04 | (2006.01) |
| A47F 3/00 | (2006.01) |
| F25D 25/02 | (2006.01) |
| F25D 29/00 | (2006.01) |

(52) U.S. Cl.
CPC .......... *G01G 23/00* (2013.01); *A47F 3/001* (2013.01); *A47F 3/0408* (2013.01); *A47F 3/0478* (2013.01); *F25D 25/02* (2013.01); *F25D 29/00* (2013.01); *G01G 19/414* (2013.01); *G06Q 10/087* (2013.01); *F25D 2500/06* (2013.01); *F25D 2700/02* (2013.01); *F25D 2700/06* (2013.01)

(58) Field of Classification Search
CPC .................................................... G01G 23/00
See application file for complete search history.

(56) References Cited

U.S. PATENT DOCUMENTS

| | | | |
|---|---|---|---|
| 3,657,475 A | | 4/1972 | Peronneau et al. |
| 3,984,667 A | | 10/1976 | Loshbough |
| 4,210,216 A | | 7/1980 | Godden |
| 4,347,903 A | | 9/1982 | Yano et al. |
| 4,419,734 A | * | 12/1983 | Wolfson ............... B65G 1/1371 177/25.13 |
| 4,481,785 A | * | 11/1984 | Tershak ................. F25D 21/006 62/153 |
| 4,553,619 A | | 11/1985 | Fujinaga |
| 4,660,160 A | | 4/1987 | Tajima et al. |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Hyun D Park
(74) *Attorney, Agent, or Firm* — Lindauer Law, PLLC

(57) ABSTRACT

Shelves or other fixtures may be used to hold items at a facility. Load cells at the fixtures may be used to acquire weight data indicative of changes to the fixture as items are added or removed from the fixture. The fixtures, such as a freezer case, may include a door that when opened or closed produces air movement with respect to the shelves. This air movement may produce weight data that could be interpreted as a false event, such as a pick or place, even when none has taken place. A door sensor provides data that is used to determine when the door has been opened or closed. Weight data occurring for some time after the opening of the door or before the closing of the door may be disregarded.

20 Claims, 14 Drawing Sheets

(56) References Cited

U.S. PATENT DOCUMENTS

| | | | |
|---|---|---|---|
| 5,143,164 | A | 9/1992 | Nahar |
| 5,561,274 | A | 10/1996 | Brandorff |
| 5,671,362 | A | 9/1997 | Cowe et al. |
| 5,750,937 | A | 5/1998 | Johnson et al. |
| 6,215,078 | B1 | 4/2001 | Torres et al. |
| 7,040,455 | B2 | 5/2006 | Bogat |
| 7,225,980 | B2 | 6/2007 | Ku et al. |
| 7,949,568 | B2 | 5/2011 | Fano et al. |
| 8,009,864 | B2 | 8/2011 | Linaker et al. |
| 8,189,855 | B2 | 5/2012 | Opalach et al. |
| 8,630,924 | B2 | 1/2014 | Groenevelt et al. |
| 9,235,928 | B2 | 1/2016 | Medioni et al. |
| 9,360,383 | B2 | 6/2016 | Coleman et al. |
| 9,473,747 | B2 | 10/2016 | Kobres et al. |
| 2006/0242908 | A1* | 11/2006 | McKinney ............ E05F 15/60 49/280 |
| 2008/0054649 | A1* | 3/2008 | Ueda .................. E05B 81/78 292/216 |
| 2009/0107938 | A1* | 4/2009 | Miller, Jr. ............ A47F 3/0404 211/133.6 |
| 2011/0011936 | A1 | 1/2011 | Morandi et al. |
| 2012/0284132 | A1 | 11/2012 | Kim et al. |
| 2013/0284806 | A1 | 10/2013 | Margalit |
| 2014/0114708 | A1* | 4/2014 | Campbell ............... G08B 5/22 705/7.11 |
| 2014/0338987 | A1 | 11/2014 | Kobres |
| 2015/0075879 | A1 | 3/2015 | Sakai et al. |
| 2015/0086107 | A1 | 3/2015 | Dedeoglu et al. |
| 2015/0318943 | A1* | 11/2015 | Zhu ..................... H04L 5/04 455/108 |
| 2016/0341597 | A1* | 11/2016 | Crooks .................. G01H 13/00 |
| 2018/0189722 | A1 | 7/2018 | Aepli |

OTHER PUBLICATIONS

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_super_markets>.

Pop, Cristian, "Introduction to the BodyCom Technology", AN1391, DS01391A, Microchip Technology, Inc., May 2, 2011.

Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

Gibson, Randy W., "Final Office Action dated Jan. 14, 2019", U.S. Appl. No. 15/388,427, The United States Patent and Trademark Office, dated Jan. 14, 2019.

Gibson, Randy W., "Non-Final Office Action dated Aug. 31, 2018", U.S. Appl. No. 15/388,528, The United States Patent and Trademark Office, dated Aug. 31, 2018.

* cited by examiner

SYSTEM TO PROCESS LOAD CELL DATA USING DOOR SENSOR DATA

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
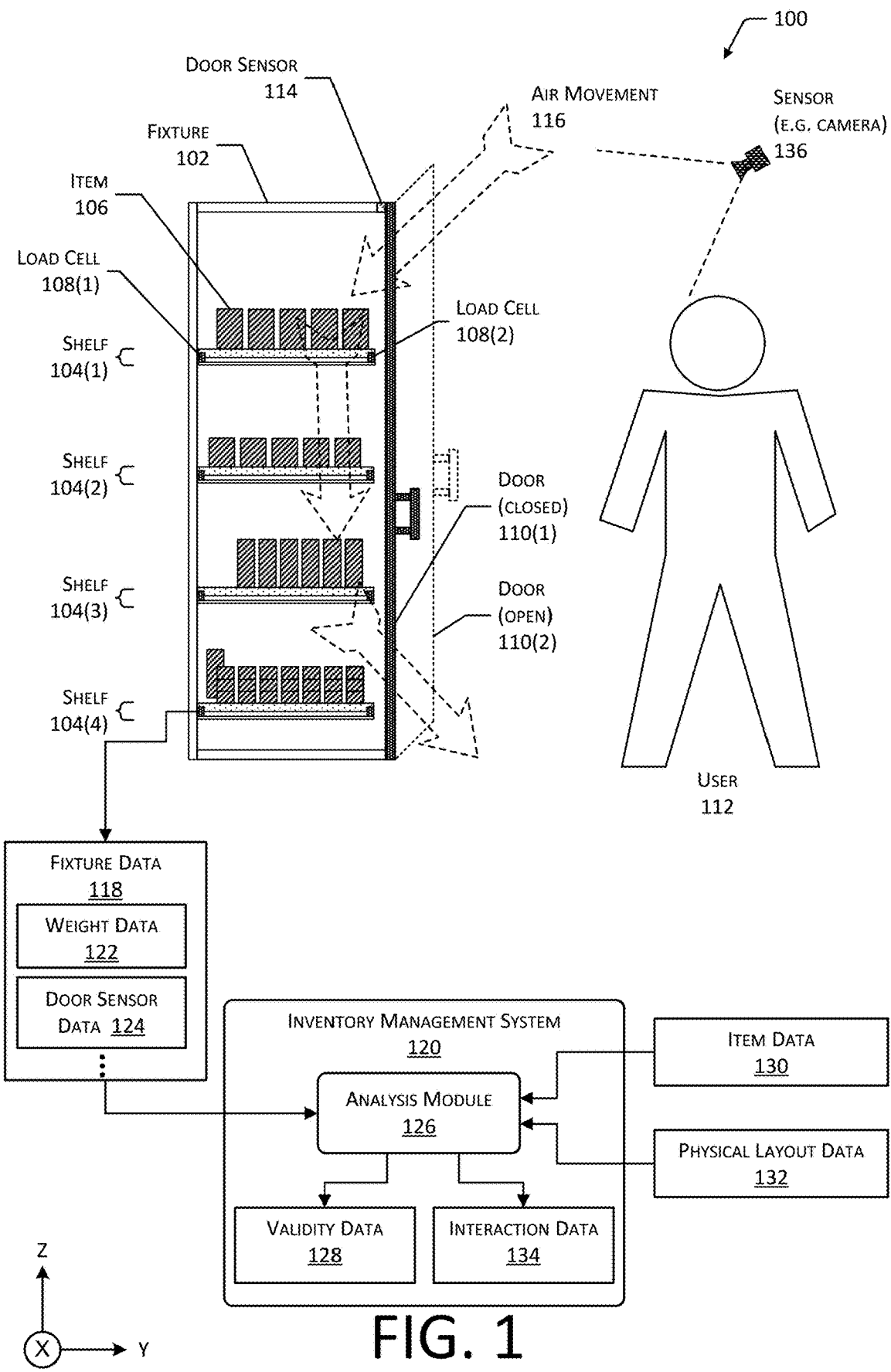
FIG. 1 illustrates a system that processes load cell data to produce reliable interaction data about the pick (removal) or place (return or loading) of items stowed on a fixture, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A materials handling facility (facility) or other setting may utilize fixtures, such as shelves, that are equipped with load cells or other weight sensing devices. These fixtures may include an enclosure with a door, within which the shelves are located. For example, a freezer case may include an insulated enclosure with a door. In some implementations, the door may be separate from the enclosure. A user of the facility may open the door to access the shelves and items stowed on those shelves.

The shelves may be mounted to, or otherwise include, load cells that measure the weight of a load on the shelf. For example, the fixture may comprise rectangular shelves, with each shelf including load cells arranged at or near each end of the shelf, at or near each of the four corners, or in other configurations.

Weight data generated by these load cells may be used to determine interactions with items stowed or otherwise held by those fixtures. The facility may include, or have access to, an inventory management system. The inventory management system may be configured to maintain information about items, users, condition of the facility, and so forth. For example, the inventory management system may maintain data indicative of a number of items at a particular fixture, what items a particular user is ordered to pick, how many items have been picked or placed at the fixture, requests for assistance, environmental status of the facility, and so forth.

Operation of the facility may be facilitated by using data from sensors, such as the load cells, to determine interactions in the facility. Interactions may comprise the user picking an item from a fixture, placing an item at a fixture, touching an item, bringing an object such as a hand or face close to an item, and so forth. For example, the inventory management system may generate interaction data that indicates what item a user picked from a particular fixture, and then use this interaction data to adjust the count of inventory stowed at the particular fixture.

The weight data may be used to determine data such as a quantity of items that have been picked from or placed to a fixture, to determine the identity of a type of item that has been picked from or placed to the fixture, and so forth. Use of load cells and the weight data offers several operational benefits, especially in a materials handling facility or other facility. These benefits may include mechanical robustness, relatively low cost for installation and maintenance, fast response times, and so forth.

As described above, the fixture may include a shelf or other structure that is supported by load cells that generate the weight data. The load cells may be sensitive enough such that air movement may cause a transitory change in the weight data being output. For example, when the door of the fixture is opened or closed, some volume of air is displaced. The displacement of this volume of air may result in erroneous weight data being generated by the load cells that indicates a change in weight when in fact, no change has taken place. When the fixture involves a refrigerated or heated interior, thermal effects may cause additional air movement, exacerbating this issue. For example, when the door of a freezer case is opened, movement of the door from a closed configuration to an open configuration displaces a mass of air which impacts the shelves and results in changes to the weight data. Continuing the example, once the door opens, cold air may spill from the interior of the fixture drawing warm air into the enclosure. The mass of air thus moved may result in some displacement of the shelf.

Erroneous weight data, if not accounted for, could result in erroneous interaction data, increased use of processing resources, and so forth. For example, the transitory change in the values of the weight data that result from the displacement of air after opening a door could result in the inventory management system generating interaction data indicative of a pick or place of an item when no such pick took place. In another example, the transitory change may trigger the system to present information to a human operator to determine if an interaction actually took place. As a result, processing of erroneous weight data may result in errors which would then have to be addressed, unnecessary consumption of resources, and so forth.

Described in this disclosure are techniques to determine whether the weight data produced by one or more load cells is deemed to be valid or not. Valid data comprises weight data that is not deemed to be likely to be produced by an air movement or mechanism other than the user. In comparison, invalid data is indicative of weight data that is deemed likely to be erroneous and thus should be disregarded from determination of interaction data.

In a first technique, the fixture may incorporate a door sensor. The door sensor provides door sensor data that is indicative of a configuration of the door at a particular time. For example, the door sensor may comprise a switch that breaks an electric circuit when the door is closed and makes an electric circuit when the door is open. Electronics may use the operation of the switch to generate the door sensor data. For example, the door sensor data may comprise a single bit binary value in which a "0" indicates that the door is closed and a "1" indicates that the door is open.

The door sensor data may be used to determine validity data indicative of whether the weight data is valid or invalid at a specific time or interval of time. The weight data may be deemed invalid if it was obtained during a time window that starts at a time when the door was opened and continues for a predetermined period of time thereafter. For example, at t=0, the door was opened. A predetermined time interval of 1 second may be specified. Continuing the example, the weight data obtained from t=0 until t=1 second may be deemed invalid. In another example, the weight data obtained whenever the door sensor data indicates the doors closed may be deemed valid. With this implementation, the actual values of the weight data may not be considered to determine validity. For example, the validity data is determined based on the time the values of the weight data were obtained and the information about the state of the door. In another example, the validity data may comprise information about the state of the door.

In a second technique, validity data may be determined using the weight data itself. During normal operation of a facility, a user may be expected to pick or place items from the shelves of the fixture. It may be deemed unlikely for simultaneous picks or places to take place at multiple shelves. In comparison, influences such as changes due to air movement when a door is opened or closed may affect several shelves at about the same time. In this implementation, the weight data is analyzed to determine if a correspondence between the weight data of the adjacent shelves at a particular window of time exceeds a threshold value. For example, the weight data from a top shelf and the weight data from the bottom shelf may be correlated to determine a correlation value. If the correlation value exceeds a threshold amount, validity data may be generated that indicates invalid weight data. If the correlation value is less than the threshold amount, validity data may be generated that indicates the weight data is valid.

Additional techniques may be used to determine validity data. These techniques may be used to determine if the weight data, or data generated from the weight data, is outside of an expected value or range of value. The values may be compared in a space which may correspond to a physical space, such as within the confines of the fixture or a portion thereof, or within in an arbitrary space having one or more dimensions.

A third technique that may be used to analyze the weight data to determine validity data that looks for conditions in the weight data that are deemed to be physically impossible, or at least physically extremely unlikely. The weight data may be accessed and used to determine an estimated location of a center of mass, estimated location of a weight change, or other data that is indicative of a physical location. The estimated location may be compared to a physical boundary of the fixture, such as a perimeter of the shelf. Influences on the shelf, such as the changes due to air movement when a door is opened or closed may result in a change in the estimated location at a given time. For example, a mass of air that impacts a leading edge of the shelf may temporarily increase the values of the weights measured by the load cells at the front of the shelf. As a result, at the time when the air impacts the front of the shelf, the estimated location of the center of mass of the shelf or an estimated location of a weight change may be erroneously determined to be several centimeters beyond the front edge of the shelf. If the estimated location is within the physical boundary of the shelf, validity data may be generated that indicates valid weight data. In comparison, if the estimated location is outside the physical boundary, validity data may be generated that indicates invalid weight data.

In a fourth technique, trajectory data may be determined from the weight data. For example, the trajectory data may comprise a time series of the weight data, a time series of values derived from the weight data, and so forth. The trajectory data may be expressed as points within a space that has one or more dimensions. The trajectory data describes a trajectory, or path through the space. The space may be arbitrary, such that a point within the space does not necessarily correspond with a point in real three-dimensional space. The trajectory describes a path through this space that may be arbitrary and may not correspond to motion in real three-dimensional space. Within the space, one or more regions may be designated as being consistent with invalid weight data. The region may be an interval in the case of a one-dimensional space, an area in the case of a two-dimensional space, a volume in the case of a three-dimensional space, and so forth. If the trajectory data indicates that the trajectory produced from the weight data does not intersect the particular region, validity data may be generated that indicates valid weight data. Likewise, if the trajectory data indicates that the trajectory produced from the weight data intersects the particular region, validity data may be generated that indicates invalid weight data. In one implementation, boundaries of the region(s) may be specified. In another implementation, a machine learning module may be trained to characterize the trajectory data and provide the validity data.

One or more of the techniques may be combined to provide a robust determination as to the validity of the weight data. For example, the fixture that includes a door sensor may produce door sensor data and weight data that are used as inputs to train a machine learning module. In the event of a failure of the door sensor, or of a fixture of similar configuration but which omits the door sensor, the machine learning module may be used to generate door status data using only weight data as input. In another example, the determination of correspondences between different shelves may be combined with the analysis of trajectory data to provide more robust door status data.

By using the devices and techniques described herein, operation of the facility may be improved. Invalid weight data containing noise is quickly and easily recognized as such and disregarded from consideration while valid data may be used to determine accurate interaction data. The reduction in invalid or false data reduces overall resource utilization by avoiding further processing either by computing devices or by having a human review. In comparison, valid weight data may be used to determine accurate interaction data.

By determining a fault in a load cell, the inventory management system is able to disregard erroneous data and avoid generating output based on faulty data. As a result, the inventory management system may be able to quickly and efficiently track what item a user has interacted with, maintain up-to-date item data, and so forth.

Illustrative System

FIG. 1 illustrates a system 100 that processes load cell data to produce reliable interaction data about a fixture, such as a shelf, according to some implementations.

A fixture 102 may include one or more shelves 104. In this illustration, four shelves 104(1)-104(4) are depicted for illustration only and not necessarily as a limitation. In other implementations, the fixture 102 may enclose greater or fewer numbers of shelves 104. The shelves 104 are configured to stow one or more items 106. In some implementations, instead of or in addition to shelves 104, other item stowage devices such as hangers, bins, and so forth, may be used.

The shelves 104 may be equipped with a plurality of load cells 108. Each load cell 108 is configured to generate information indicative of a weight applied thereto. For example, the load cell 108 may comprise a weight sensor that supports at least a portion of the fixture 102. The load cells 108 are described in more detail below.

The fixture 102 may comprise an enclosure, with the shelves 104 located within. The fixture 102 may include a door 110 that provides a barrier between an interior of the enclosure and the exterior environment. For example, the fixture 102 may comprise an insulated enclosure and a refrigeration mechanism to provide a cold case for the storage of chilled or frozen items 106 therein. The refrigeration mechanism may comprise Peltier junctions, passive heat transfer system using a refrigerant or thermally conductive element, active heat transfer system using a pump that circulates a refrigerant through a heat exchanger, and so forth. In another example, the fixture 102 may comprise a "hot case" or an insulated enclosure and heating devices, such as incandescent heat lamps or heating elements, to provide for the storage of warm or hot items 106 therein. In some implementations, fans, blowers, or other devices may be used to move air within the fixture 102, resulting in air movement 116. For example, the heating elements may comprise electrically resistive ceramic elements such as molybdenum disilicide, barium titanate, electrically resistive wire such as nichrome, burners, and so forth.

The door 110 may be moved between a closed configuration 110(1) and an open configuration 110(2). In the closed configuration 110(1), the door 110 provides a barrier between an interior of the fixture 102 and the exterior environment. In the open configuration 110(2), the door 110 no longer provides this barrier.

During operation of the facility, a user 112 may approach the fixture 102 and open the door 110 to access one or more of the items 106 stowed therein on one or more shelves 104. Once the user 112 has completed their interaction with the items 106, the door 110 may close.

In some implementations, the fixture 102 may include a door sensor 114. The door sensor 114 provides information indicative of the configuration of the door 110. The door sensor 114 may utilize any number of different devices to determine a state of the door 110.

In some implementations, the door sensor 114 may comprise one or more of a switch, a capacitive proximity sensor, an ultrasonic proximity sensor, an optical proximity sensor, a magnetic field sensor, an anemometer, a temperature sensor, a potentiometer, a force sensitive resistor, an optical encoder, a camera, and so forth. For example, the fixture 102 may include a switch that is configured to make or break a contact in response to a mechanical force provided by the door 110. Continuing the example, the switch may be spring-loaded such that, when the door 110 is open, a contact is made and electric circuit completed and when the door 110 is closed, the contact is opened or broken. In another example, a camera may have a field of view that includes at least a portion of the door. The camera may be mounted to the fixture 102, may be inside the fixture 102, may be overhead, on a wall, on another fixture 102, and so forth. The images obtained from the camera may be processed to determine the position of the door 110 with respect to the fixture 102. For example, an object recognition module may be used to detect the door 110 and determine if the door 110 is open or closed. In another example, the door 110 may include an optical target, such as a particular visual fiducial, barcode, and so forth. The optical target may be detected within the image data and used to determine the door sensor data 124.

The door sensor 114 may be mounted on the fixture 102, on a shelf 104, on a structure supporting the shelf 104, on the door 110, and so forth. In some implementations, the door sensor 114 may be proximate to or at least partially within a handle of the door 110. For example, the door sensor 114 may comprise a pressure sensor or pressure contact switch that detects a hand of the user 112 grasping the handle. In another example, the door sensor 114 may comprise a proximity sensor that detects the presence of an object near the handle of the door 110. In yet another example the door sensor 114 may comprise a touch sensor, such as a galvanic, capacitive, inductive, or resistive circuit, that detects a touch of a user's hand to the handle of the door 110. The resulting data produced by the door sensor 114 associated with the handle is thus indicative of use of the handle.

Air movement 116 or other environmental influences such as vibration from movement of the door 110, a nearby train, and so forth may affect operation of the load cells 108. For example, as the door 110 is opened or closed, movement of the door 110 may result in a displacement of some mass of air. This mass of air may come in contact with at least a portion of a shelf 104 temporarily applying a force that is registered by the load cell 108 as a change in weight. However, this effect is typically transitory and does not reflect an actual change in the load of the items 106 upon the shelf 104.

When the fixture 102 involves a refrigerated or heated interior, thermal effects may cause additional air movement, exacerbating this issue. For example, when the door 110 of a freezer case is opened, movement of the door 110 from a closed configuration door 110(1) to an open configuration door 110(2) displaces a mass of air which impacts the shelves 104 and results in changes to the weight data. Continuing the example, in addition to the displacement of air caused by the movement of the door 110, once the door 110 is open the denser cold air may spill from the interior of the fixture 102, drawing warm air into the enclosure. The mass of air thus moved may result in some displacement of the shelf 104. This air movement 116 is depicted in this figure using arrows drawn with dotted lines. In other implementations, devices such as blowers or fans may produce air movement 116 within at least a portion of the interior of the fixture 102.

The fixture 102 may include one or more electronic devices that are designed to acquire fixture data 118, and provide that fixture data 118 to an inventory management system 120. The fixture data 118 may include one or more of weight data 122, door sensor data 124, or other data from sensors in or on the fixture 102.

The weight data 122 is indicative of the weight as measured by the load cells 108. For example, the load cells 108 may send weight signals to a computing device of the fixture 102 that then generates the weight data 122, which includes weight values and timestamps indicative of when those weight values were obtained. In some implementations, the computing device of the fixture 102 may provide various functions, such as filtering or otherwise conditioning the weight signals, generating and transmitting the weight data 122, and so forth.

The door sensor data 124 is indicative of output from the door sensor 114. For example, the fixture 102 may include electronics that generate door sensor data 124 by determining if a switch acting as the door sensor 114 is open or closed.

In some implementations, the door sensor data 124 may be inserted into a portion of the weight data 122. For example, the door sensor data 124 may comprise a single bit binary value in which a "0" indicates the door 110 is closed and a "1" indicates the door 110 is open. Multiplexing techniques may be used to replace a least significant bit from the weight data 122 with the single bit binary value of the door sensor data 124, generating multiplexed data. In one implementation, a computing device, hardware multiplexor, or other device may be configured to access the weight data 122 and replace one or more bits of the weight data 122 with the sensor data from the door sensor 114 to create multiplexed data. This multiplexed data may then be transmitted using a communication interface. For example, a computing device at the fixture 102 that acquires the weight data 122 from the load cells 108 and the door sensor data 124 from the door sensor 114 and transmits that fixture data 118 using a network may be configured to provide this operation. By encoding the door sensor data 124 as a least significant bit any subsequent processing of the weight data 122 that is not configured to utilize or disregard that bit does not produce significant changes in the operation of the system. Additionally, by encoding the door sensor data 124 in this fashion, subsequent processing is able to readily determine the door state with a granularity that may extend to individual samples of weight data 122.

The inventory management system 120 may be configured, as described below, to perform various functions with regard to a facility. To perform these functions, the inventory management system 120 may accept the fixture data 118, data from other sensors, and so forth.

The inventory management system 120 may include or have access to an analysis module 126. The analysis module 126 is configured to accept as input fixture data 118 and determine validity data 128. The validity data 128 provides information indicative of whether at least a portion of the weight data 122 is deemed to be valid or invalid. For example, the validity data 128 may indicate that a first portion of the weight data 122 that was obtained between a first time and a second time is valid, while a second portion of the weight data 122 that was obtained between a third time and a fourth time is invalid.

The analysis module 126 may utilize one or more techniques to determine the validity data 128. A first technique utilizes the door sensor data 124. For example, the weight data 122 associated with a particular interval of time that includes the door 110 opening or closing may be deemed to be invalid. A second technique determines data about the correspondence between the weight data 122 from a plurality of shelves 104 during a particular interval of time to determine the validity data 128. For example, within the particular interval of time, the air movement 116 may similarly affect the weight data 122 generated by the shelves 104(1)-(4), resulting in a high correlation between the weight data 122 from the respective shelves 104. This high correlation may be indicative of invalid weight data 122 during that particular interval of time. A third technique uses an estimated location of the center of mass of a shelf 104 to determine the validity data 128. For example, if the estimated location of a center of mass of the shelf 104 is beyond the physical boundary of the shelf 104, the weight data 122 during that particular interval of time may be deemed to be invalid. A fourth technique determines trajectory data from the weight data 122 to determine the validity data 128. These techniques are described in more detail at least in FIGS. 3-11.

The inventory management system 120 may maintain and utilize item data 130 and physical layout data 132. The item data 130 comprises information about a particular type of item 106. The item data 130 may include information indicative of a weight of a single item 106, or a package, kit, or other grouping considered to be a single item 106. The item data 130 may include other characteristics of that type of item 106 such as: physical dimensions, characteristics about how the item 106 appears, and so forth. For example, the item data 130 may comprise a plurality of local descriptor values generated by feature extraction algorithms, parameters for classifiers, neural network configuration data, and so forth, that characterizes the appearance of a representative one or more of the item 106. The item data 130 may indicate the types and quantities of items 106 that are expected to be stored at that particular fixture 102, such as in a particular lane on a fixture 102. The item data 130 may include other data. For example, the other data may comprise weight distribution of the item 106, point cloud data for the item 106, and so forth.

The physical layout data 132 may provide information indicative of where fixtures 102 are in the facility, location of sensors, information about sensor orientation and field of view (where applicable), and so forth. For example, the physical layout data 132 may comprise information representative of a map or floor plan of the facility with relative positions of fixtures 102, planogram data indicative of how types of items 106 are to be arranged at the fixtures 102, and so forth. In another example, the physical layout data 132 may comprise information indicating the particular placement of load cells 108 on a particular fixture 102.

During operation, the analysis module 126 may access one or more of the fixture data 118, weight data 122, the door sensor data 124, the item data 130, the physical layout data 132, or other data to generate interaction data 134. For example, the facility may include other sensors 136, such as cameras having a field of view that includes at least a portion of the fixture 102. The sensors 136 generate sensor data, such as image data from the camera.

The interaction data 134 provides information about an interaction, such as a pick of an item 106 from the fixture 102, a place of an item 106 to the fixture 102, a touch made to an item 106 at the fixture 102, a gesture associated with an item 106 at the fixture 102, and so forth. The interaction data 134 may include one or more of the type of interaction, interaction location identifier indicative of the fixture 102 at which the interaction took place, an item identifier indicative of a type of item 106 or particular item 106, quantity change to the item 106, user identifier, and so forth. The interaction data 134 may then be used to further update the item data 130. For example, the quantity of items 106 on hand at a particular partitioned area on the fixture 102 may be changed based on an interaction that picks or places one or more items 106. Operation of the analysis module 126, including generation of the interaction data 134, is discussed in more detail below.

In order to provide interaction data 134 with the best accuracy, the analysis module 126 should be provided with weight data 122 that is not erroneous or invalid. As described above, air movements 116 or other phenomena may result in the weight data 122 including invalid data.

As described above, the analysis module 126 may be configured to assess the weight data 122 and generate validity data 128. This validity data 128 may be used to assess the weight data 122 prior to processing to determine interaction data 134. For example, weight data 122 that is indicated by the validity data 128 as being invalid may be disregarded and not processed to determine interaction data 134 while weight data 122 that is indicated by the validity data 128 as being valid may be processed and used to determine the interaction data 134. In this way, the analysis module 126 avoids processing erroneous weight data 122 that could lead to incorrect interaction data 134 being generated.

The analysis module 126, or other modules, may process the weight data 122 to determine if an event has taken place at the fixture 102. Events may include a pick or place of an item 106. One or more change detection algorithms may be used to identify when the weight values have changed in such a way as to meet or exceed a threshold value. For example, the event may be determined using a cumulative sum (CUSUM) function. An event may include weight data 122 that begins at a start time and continues through an end time. In some implementations, an event may be categorized as valid or invalid based on the validity data 128 associated with the associated weight data 122.

By using these techniques, the amount of erroneous weight data 122 that is processed is reduced improving overall system efficiency and reducing computing resource needs. Additionally, by validating the weight data 122, the accuracy of the interaction data 134 is improved, improving overall accuracy of the inventory management system 120 and the facility as a whole.

Figure 2:
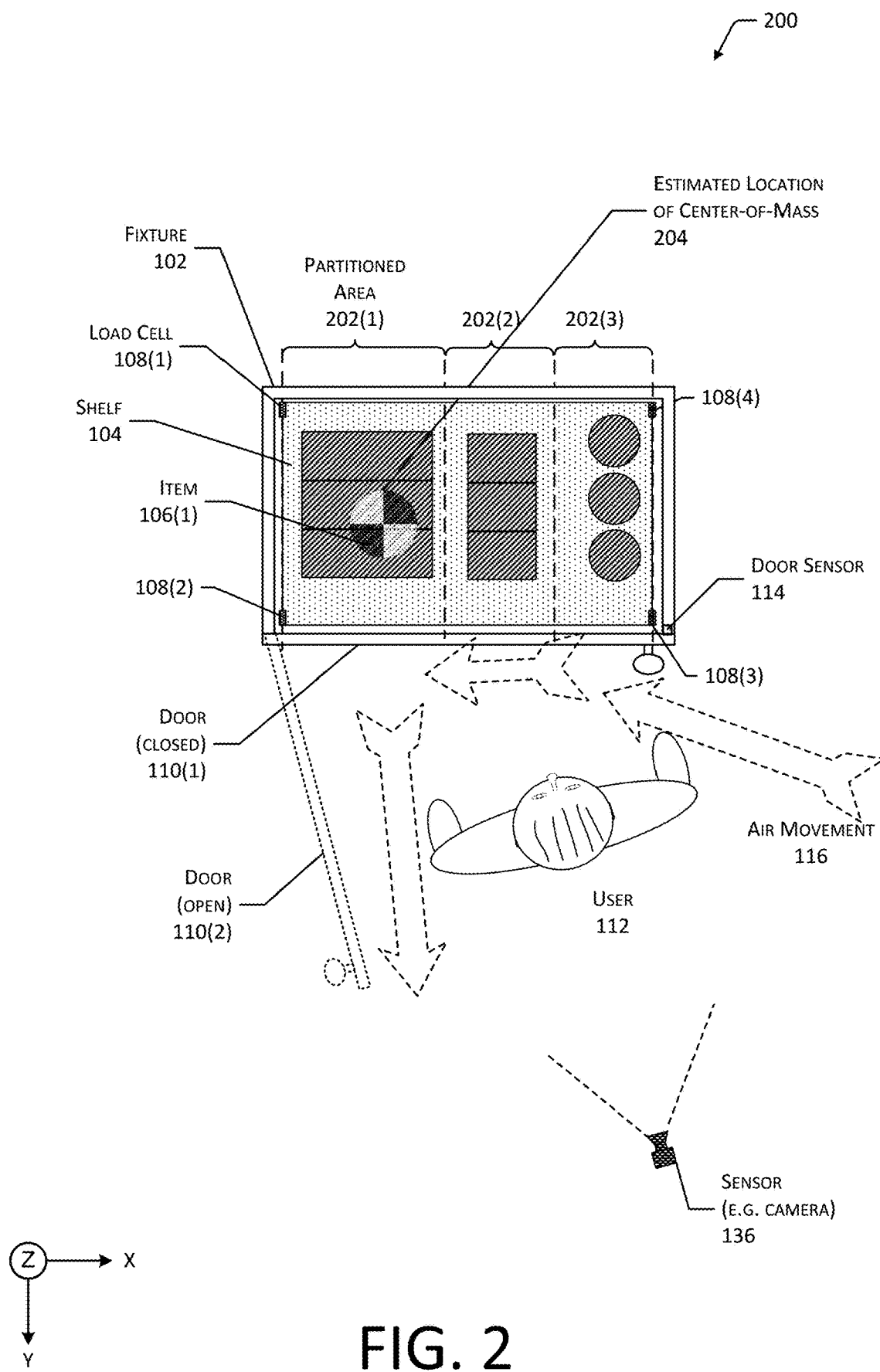
FIG. 2 is an overhead view of a fixture, such as a freezer case, that includes shelves with load cells and a door, according to some implementations.

FIG. 2 is an overhead view 200 of a fixture 102, such as a freezer case, that includes shelves 104 with load cells 108 and a door 110, according to some implementations.

As depicted here, the weight of a shelf 104 in the fixture 102 may be measured using four load cells 108(1), 108(2), 108(3), and 108(4). Each load cell 108 may be located at the four corners of the rectangular fixture 102. For example, the load cell 108(1) is located at a rear left corner, the load cell 108(2) is located at a front left corner, the load cell 108(3) is located at a front right corner, and the load cell 108(4) is located at a rear right corner. In other implementations, other arrangements of load cells 108 may be utilized.

The fixture 102 may be divided into one or more partitioned areas 202. The partitioned areas 202 are an area upon the shelf 104 that is associated with a particular type of item 106. For example, the shelf 104 depicted here has three partitioned areas 202(1), 202(2), and 202(3). Partitioned area 202(1) may be associated with storing some quantity of item 106(1) such as frozen fish, while partitioned area 202(2) may be associated with storing some quantity of item 106(2) such as frozen vegetables, and partitioned area 202(3) may be associated with storing some quantity of item 106(3) such as frozen fruit.

A user 112 may interact with the partitioned areas 202 at the shelf 104. For example, the user 112 may remove item 106(1) from the partitioned area 202(1). The user 112 may then return the item 106(1) to the fixture 102. Several users 112 may interact with the same fixture 102.

At a given time, an estimated location of a center of mass (COM) 204 may be determined based on the weight data 122 provided by the load cells 108(1)-(4) of the shelf 104. As the weight distribution on the shelf 104 changes over time, so too does the estimated location of the COM 204 change over time.

As described above, when the door 110 is opened air movement 116 may result in erroneous weight data 122. For example, the force of the air movement 116 may press down disproportionately on a front edge of the shelf 104 that is closest to the door 110, and result in an estimated location of COM 204 that is beyond the physical boundary of the shelf 104.

In some implementations, the analysis module 126 may use the validity data 128 to determine whether to use data obtained from other sensors 136. For example, based on the door sensor data 124 image data obtained from a camera sensor 136(1) may be disregarded for a period of time.

Figure 3:
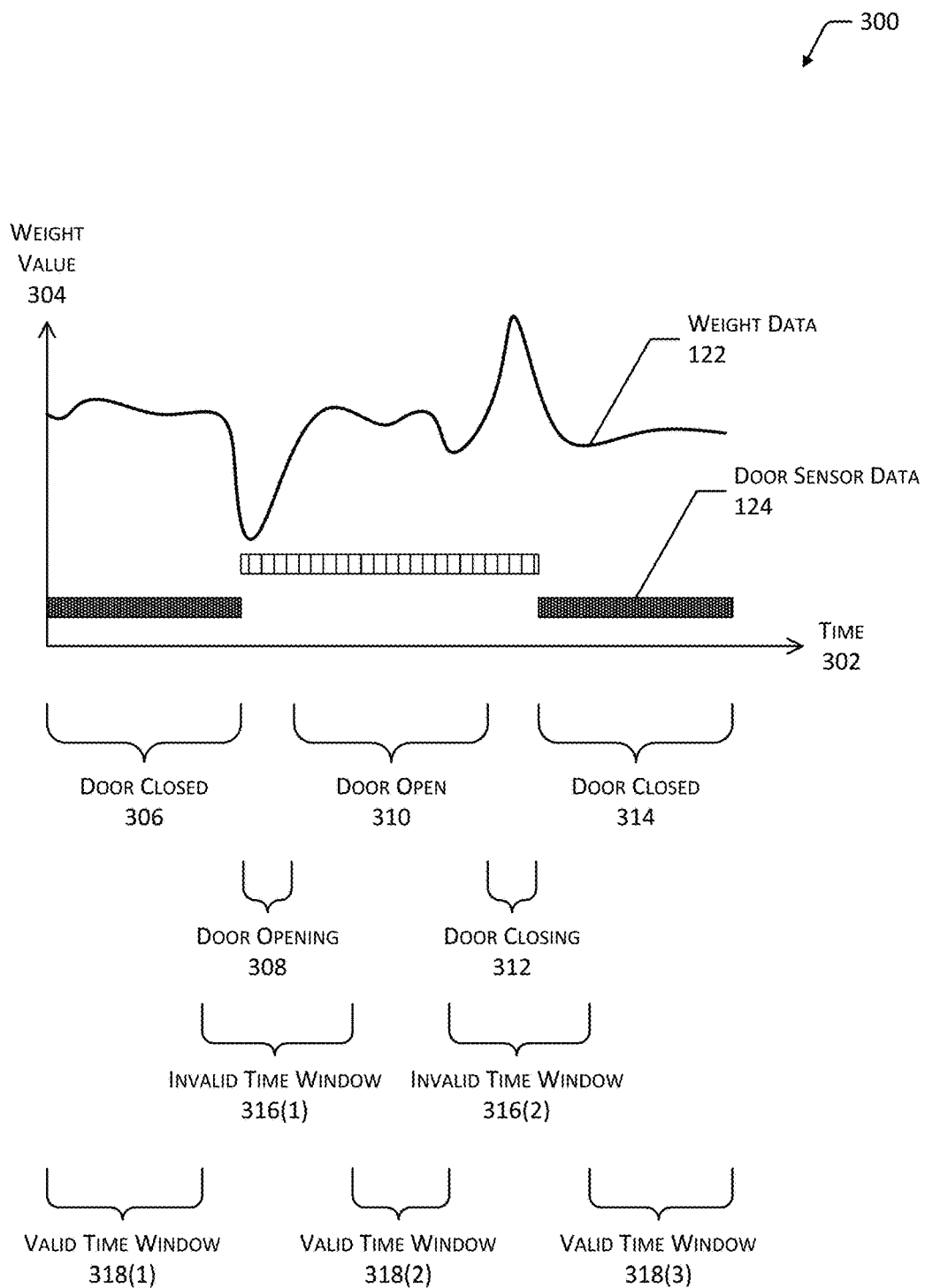
FIG. 3 depicts a graph of weight data and door sensor data that are used to determine when weight data from load cells is valid, according to some implementations.

FIG. 3 depicts a graph 300 of weight data 122 and door sensor data 124 that are used to determine when weight data 122 from load cells 108 is valid, according to some implementations. In this illustration, the graph 300 includes a horizontal axis in which time 302 increases from left to right wall of a perpendicular vertical axis indicates a weight value 304 obtained from the weight data 122. For example, the weight value 304 may comprise a value indicative of a weight on load cell 108 at a particular time, the weight value 304 may comprise a sum of the load cells 108 at a particular shelf 104 a particular time, the weight value 304 may result from processing the weight data 122, and so forth. Also depicted is the configuration of the door 110 based on the door sensor data 124, such as whether the door sensor 114 indicates the door 110 is open or closed.

As time 302 progresses, the door 110 of the fixture 102 transitions between a closed and an open configuration. At 306, the door is closed, followed by a door opening 308, the door being open 310, the door closing 312, and the door being closed 314. Over the span of time 302, the weight data 122 changes. For the example depicted here, assume that no pick or place took place, and as a result, the weight of the items 106 on the shelf 104 was unchanged. The weight values 304 show a temporary decrease during the period in which the door is opening 308, and show a temporary increase during the period in which the door is closing 312. As described above, these changes in weight values 304 result from air movement 116 that interacts with the shelf 104. For example, the movement of air resulting from the surface of the door 110 displacing air may exert a pressure on the shelf 104, producing a temporary increase in weight values.

In some implementations, the analysis module 126 may be configured to designate invalid time windows that include a transition from one door configuration to another. For example, a first invalid time window 316(1) is depicted that begins shortly before the door sensor data 124 indicates a transition from a closed door 306 to an open door 310. Continuing the example, a second invalid time window 316(2) is depicted that begins shortly before the door sensor data 124 indicates a transition from an open door 310 to the closed door 314. The invalid time window 316 may have a duration that is manually configured, dynamically adjusted, and so forth. For example, the invalid time window 316 may have a specified duration that extends from 100 ms before a transition in door configuration to a time 1000 ms after the transition. The analysis module 126 may generate validity data 128 that indicates as invalid the weight values 304 or the weight data 122 upon which the weight values 304 are based. The invalid time window 316 allows time for the weight data 122 or the weight values 304 to settle or otherwise stop being affected by air movements 116 or other effects resulting from a change in door configuration.

In some implementations, the invalid time window 316 may differ based on the type of transition. For example, a first invalid time window 316(1) may be associated with the transition from a closed state to an open state, while a second invalid time window 316(2) may be associated with the transition from an open state to a close state. Continuing the example, the first invalid time window 316(1) associated with a transition from closed to open may start at the time of the transition and continue until 500 ms afterwards, while the second invalid time window 316(2) associated with a transition from open to closed may extend from 700 milliseconds before a time of the transition until the time of the transition.

In some implementations, the weight data 122 obtained during the invalid time window 316 may be utilized, but may be flagged or otherwise associated with data indicative of a low confidence in the validity. For example, the weight data 122 may include data that is indicative of the door sensor data 124 or a change in the door state. This weight data 122 may then be used by the inventory management system 120 to determine interaction data 134, but the interaction data 134 may be subsequently assigned a low confidence value or other indicia indicative of low confidence due to the potentially invalid weight data 122.

Also depicted are valid time windows 318. The valid time windows 318 depicted here are exclusive from the invalid time windows 316. For example, a first valid time window 318(1) is shown before the first invalid time window 316(1), a second valid time window 318(2) is shown between the end of the first invalid time window 316(1) and the beginning of the second invalid time window 316(2), and a third valid time window 318(3) is depicted after the second invalid time window 316(2). The analysis module 126 may generate validity data 128 that indicates that the weight data 122 obtained during a valid time window 318 is deemed to be valid. This valid weight data 122 may be used generate interaction data 134.

In some implementations, the door sensor data 124 may be indicative of the extent to which the door 110 is open. The door sensor data 124 may be indicative of an angular value or range or "bucket" value. For example, the door sensor data 124 may indicate that the door 110 is open with an angle of 92°, that the door 110 is halfway open, or that the door 110 is slightly ajar. By utilizing door sensor data 124 that provides more information as to the configuration of the door 110, the analysis module 126 may be better able to deal with dynamic changes in the environment. For example, the door sensor data 124 may include or may be used to generate a value that is indicative of how far the door 110 is open. If this value exceeds a threshold value, the weight data 122 may be deemed valid even though the door 110 is slightly open. Continuing the example, if the door 110 is slightly ajar, the weight data 122 may still be considered valid and used to generate an inventory count of items 106 at the shelf 104.

By utilizing the door sensor data 124 obtained from the door sensor 114, the analysis module 126 may be able to generate validity data 128, and more accurately generate interaction data 134. For example, the interaction data 134 may be more accurate because the erroneous weight data 122 resulting from air movement 116 that occurs when the user 112 opens or closes the door 110 may be disregarded.

Figure 4:
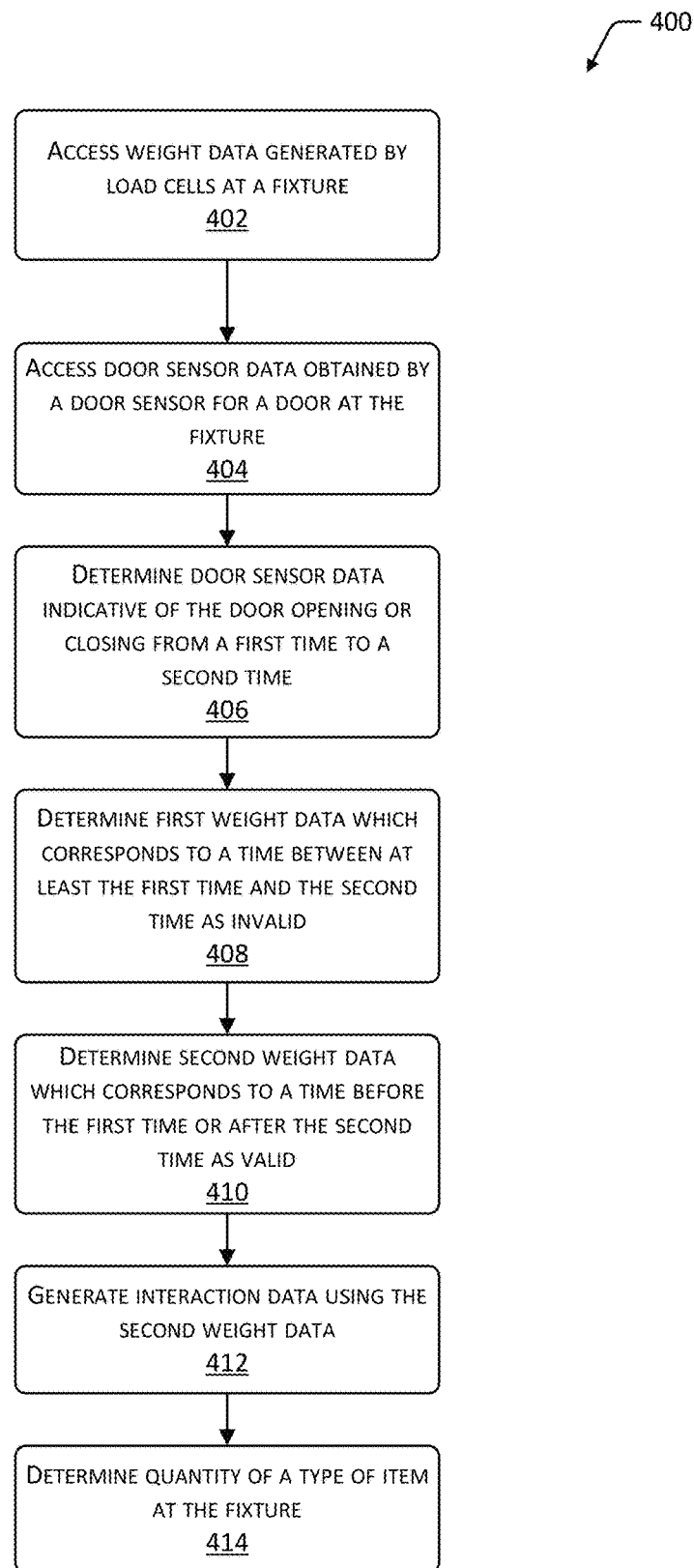
FIG. 4 is a flow diagram illustrating a process to determine interaction data based on weight data that has been determined to be valid, according to some implementations.

The door sensor data 124 may be used in other ways. For example, if the door sensor data 124 indicates that the door 110 is closed, it may be assumed that the user 112 is unable to add or remove items 106 from the shelves 104. As a result, while the door sensor data 124 indicates the door 110 is closed, the analysis module 126 may deem the weight data 122 during that time as being invalid, or as being of limited validity FIG. 4 is a flow diagram 400 illustrating a process to determine interaction data 134 based on weight data 122 that has been determined to be valid, according to some implementations. The process may be implemented at least in part by one or more of the fixture 102, computing devices located at or connected to the fixture 102, the inventory management system 120, and so forth.

At 402, weight data 122 generated by one or more load cells 108 at a fixture 102 is accessed. For example, the weight data 122 may comprise a time series of weight values 304 generated by an array of load cells 108 that weight a shelf 104.

At 404, door sensor data 124 obtained by one or more door sensors 114 is accessed. For example, the door sensor 114 may comprise a switch, and the door sensor data 124 may comprise an indication as to whether the switch is open or closed at a particular time.

At 406, the door sensor data 124 is determined that is indicative of one or more of a configuration of the door 110 at a particular time, change in the configuration of the door 110, and so forth. For example, the door sensor data 124 may be indicative of the door opening or closing from a first time to a second time. The door sensor data 124 may comprise a single bit binary value with a zero indicating that the door 110 is closed and one indicating that the door 110 is open. In some implementations, the door sensor data 124 may be indicative of a transition at a particular time. For example, the door sensor data 124 may indicate that the door 110 has changed between one configuration another, but does not necessarily specify the start or end configuration.

In some implementations, the door sensor data 124 may be included within the weight data 122. One or more bits of the weight data 122 may be replaced with values used to represent the door sensor data 124. Continuing the example, a least significant bit of the weight data 122 may be replaced with single bit value that is indicative of the door configuration.

The door sensor data 124 may be used to determine validity data 128 indicative of validity of the weight data 122. For example, the validity data 128 may be such that weight data 122 obtained while the door 110 is opening or closing is deemed to be invalid.

At 408, first weight data 122(1) which corresponds to a time between at least the first time and the second time is determined to be invalid. For example, the first weight data 122(1) may comprise the weight data 122 that occurs within the first invalid time window 316(1).

At 410, second weight data 122(2) which corresponds to a time before the first time or after the second time is determined to be valid. For example, the second weight data 122(2) may comprise weight data 122 that produces weight values 304 in one of the valid time windows 318 illustrated in FIG. 3.

In some implementations, door sensor data 124 obtained from another door 110 may be used to determine the validity data 128. For example, if the user 112 opens a first door 110 the resulting air movement 116 may affect the load cells 108 of the fixtures 102 located to the left and right of that first door 110. The validity data 128 used to determine the validity of weight data 122 may be based on the door sensor data 124 associated with another door 110 on the same fixture 102, or from a door 110 on another fixture 102.

At 412, interaction data 134 is generated using the second weight data 122(2). The interaction data 134 may be indicative of one or more of a pick or place of a type of item 106 to or from the shelf 104, or other portion of the fixture 102. For example, the weight data 122 that has validity data 128 indicating that it is deemed to be valid may be used determine a weight change at a particular shelf 104 or location thereon and produce interaction data 134 indicative of a pick or place of one or more items 106.

In some implementations, at least a portion of the invalid weight data may be used to determine the interaction data 134. For example, the weight data 122 associated with validity data 128 indicative of invalid data may be used to generate interaction data 134 that has is deemed to be of lower confidence or lesser reliability than when using weight data 122 associated with validity data 128 indicative of valid data.

At 414, a quantity of the type of item 106 at the fixture 102 is determined. For example, the interaction data 134 may indicate that a quantity of six cans of frozen juice have been removed from the shelf 104(1), and the quantity on hand may be decreased accordingly.

In some implementations, a computing device located at or near the fixture 102 may determine the validity data 128. To minimize network bandwidth, minimize processing resources at the inventory management system 120, or to provide other benefits the computing device may be configured to selectively transmit the weight data 122 that is deemed to be valid to the inventory management system 120. For example, weight data 122 deemed to be valid may be transmitted using a communication interface while weight data 122 deemed to be invalid is not. In other implementations, the fixture data 118 may be sent to the inventory management system 120 which then makes a determination as to the validity as described above. For example, the inventory management system 120 may disregard the weight data 122 for a particular interval associated with the door sensor data 124.

Figure 5:
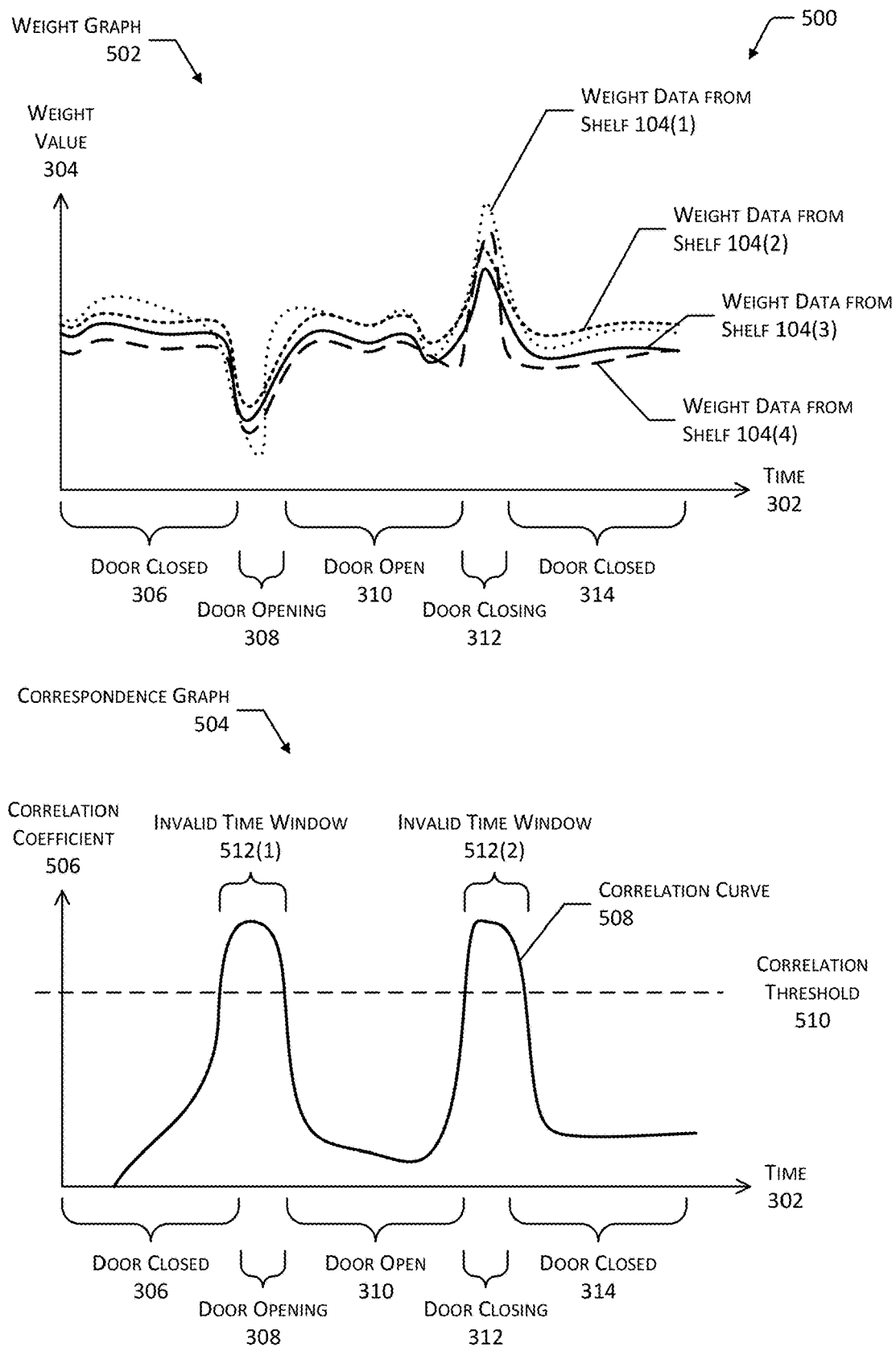
FIG. 5 depicts graphs of weight values from multiple shelves and a correspondence between those weight values to determine when weight data from load cells is valid, according to some implementations.

FIG. 5 depicts graphs 500 of weight values 304 from multiple shelves 104 and a correspondence between those weight values 304 to determine when weight data 122 from load cells 108 is valid, according to some implementations. Shown are a weight graph 502 and a correspondence graph 504.

The weight graph 502 depicts time 302 on the horizontal axis and weight values 304 along a vertical axis. In this weight graph 502, weight data 122 from four shelves 104 (1)-(4) are depicted. Similar to that shown in FIG. 3, several intervals of time 302 are labeled to show when the door was closed 306, when the door was opening 308, when the door was open 310, when the door was closing 312, and when the door was closed 314. As with FIG. 3, for this illustration, assume that no items 106 were added or removed. The decreases and increases in the weight values 304 are due to something other than a pick or place, such as air movement 116, the vibration of the facility, and so forth.

The weight data 122 from the shelves 104 may comprise an overall aggregate weight value 304, separate sets of weight values 304 associated with individual load cells 108, and so forth.

In some implementations, the door sensor 114 may be unavailable or inoperable. By using the weight data 122 from a plurality of shelves 104, the analysis module 126 may determine if there is a correspondence between the weight data 122 from different shelves 104. The air movement 116 or other environmental factors such as building vibration, earthquakes, and so forth, typically will affect more than one shelf 104 at any given time. For example, the air movement 116 may result in changes in the weight data 122 for several shelves 104 at about the same time. It may be deemed extremely unlikely to have multiple users 112 simultaneously interacting with several shelves 104. As a result, changes that occur at about the same time across multiple shelves 104 may be deemed to be invalid.

The correspondence graph 504 indicates time 302 along the horizontal axis while the vertical axis indicates a correlation coefficient 506. The correlation coefficient 506 comprises a value that is representative of a correlation or other correspondence between two or more sets of data. For example, the correlation coefficient 506 may comprise the output of a correlation function that is using as input the weight data 122 obtained from shelves 104(1)-104(4) at a particular time or during a particular interval of time. The greater the value of the correlation coefficient 506, the greater the similarity between the two or more sets of data that are being compared with one another. Depicted is a correlation curve 508 that is indicative of the correlation between the weight data 122 from the four shelves 104(1)-(4) over time.

A correlation coefficient 506 that is greater that a correlation threshold 510 indicates that the weight data 122 is deemed to be similar. The greater the correlation coefficient 506, the greater the degree of similarity. In this illustration, there are two peaks in which the correlation curve 508 exceeds the correlation threshold 510. These peaks correspond to the door opening 308 and the door closing 312. The first peak may be deemed a first invalid time window 512(1) while the second peak may be deemed a second invalid time window 512(2). Similar to that described above, the weight data 122 associated with the invalid time window 512 may be disregarded. The weight data 122 that occurs outside of these invalid time windows 512 may be deemed to be valid and may be further processed by the analysis module 126 to determine interaction data 134.

Figure 6:
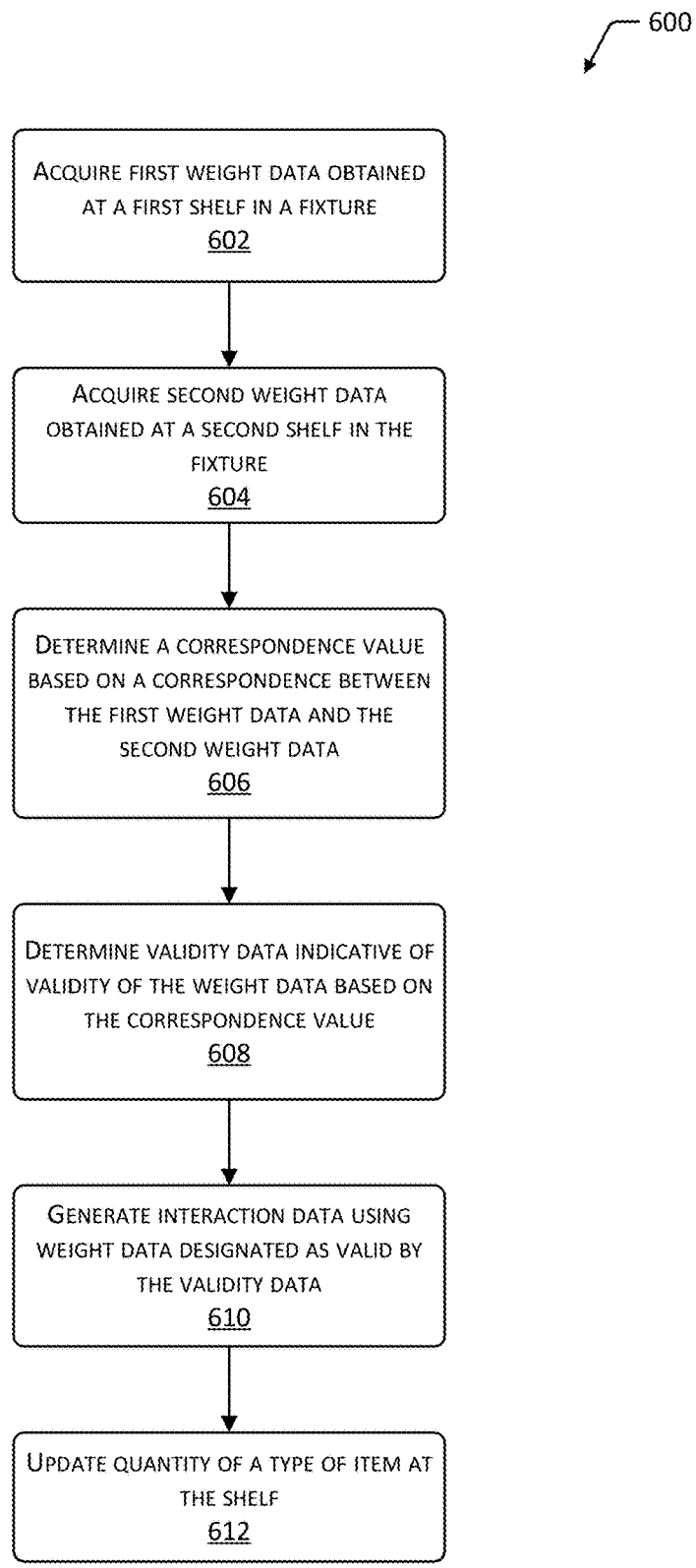
FIG. 6 is a flow diagram illustrating a process to determine validity of events based on weight data using a correspondence between weight data from multiple shelves, according to some implementations.

FIG. 6 is a flow diagram 600 illustrating a process to determine validity of events based on weight data using a correspondence between weight data from multiple shelves, according to some implementations. The process may be implemented at least in part by one or more of the fixture 102, computing devices located at or connected to the fixture 102, the inventory management system 120, and so forth.

At 602, first weight data 122(1) is obtained at a first shelf 104(1) in a fixture. For example, the first weight data 122(1) may be obtained from a plurality of load cells 108 at the first shelf 104(1). The first weight data 122(1) may be acquired during, or otherwise be associated with, a first time interval.

At 604, second weight data 122(2) is obtained at a second shelf 104(2) in a fixture. For example, the second weight data 122(2) may be obtained from a plurality of load cells 108 at the second shelf 104(2). The second weight data 122(2) may be acquired during, or otherwise be associated with, the first time interval.

At 606, the correspondence value is determined based on the correspondence between the first weight data 122(1) and the second weight data 122(2). The correspondence value may be determined for weight data 122 acquired from a plurality of shelves 104. For example, the correspondence value may comprise a value indicative of correlation between the first weight data 122(1) and the second weight data 122(2). While this example describes two shelves and first and second weight data, it is understood that weight data from more than two shelves 104 may be processed as described herein. In some implementations, a cross-correlation function may be used to generate the correspondence value. For example, the xcorr function provided in MATLAB by Mathworks Inc. of Natick, Mass. may be used. In another example, the cross-correlation function may comprise the scipy.signal.correlate function in the Scipy library as promulgated by scipy.org. The correspondence value may be a single value, may be expressed as a function, time series of values, matrix, and so forth. One or more of the sign or magnitude of the correspondence value may vary. For example, a positive correspondence value may be indicative of a significant correspondence between the first weight data 122(1) and the second weight data 122(2). In another example, a negative correspondence value may be indicative of a significant correspondence. For ease of illustration and not necessarily as a limitation, in this disclosure the correspondence value may be expressed as a positive number with greater numbers indicating a greater degree of correspondence.

In some implementations, the first interval of time may be at least 250 ms long, and the load cells 108 may acquire samples of weight data at least 120 times per second. In other implementations, other durations of the first interval may be used, as well as other sample rates.

The correspondence value may be determined using weight data 122 from shelves 104 that are immediately adjacent, such as one above another, comparing all of the shelves 104 on a rack, or other combinations or subsets of adjacent shelves 104. For example, the correspondence value may be determined using weight data 122 from shelf 104(1) and shelf 104(4). In one implementation, the physical layout data 132 or other data may be accessed to determine shelves 104 that are within a threshold distance of one another. For example, the correspondence value may be determined using weight data 122 from shelves 104 that are within five feet of a particular shelf 104, within five feet of a particular door 110, and so forth. The weight data 122 from the shelves that are within a threshold distance then be processed as described. In another example, the correspondence value may be determined using weight data 122 from shelves 104 that are within a common enclosure. For example, a freezer case may have six racks of shelves 104, each rack having five shelves. The correspondence value may be determined using weight data 122 obtained from two or more of the thirty shelves in the freezer case.

In other implementations, other techniques may be used to determine the correspondence between the weight data 122 from different shelves 104. For example, the weight data 122(1) from a first shelf 104(1) may be processed to determine a first change in weight from a first time to a second time. Continuing the example, the weight data 122(2) from a second shelf 104(2) may be processed to determine a second change in weight from the first time to the second time. The correspondence value may thus correspond to one or more of the sign or magnitude of the first change in weight and the second change in weight.

At 608, validity data 128 is determined based on the correspondence value. As described above, it may be assumed that if adjacent shelves 104 exhibit the same or similar changes with regard to their weight at the same time, these changes may be due to something other than a pick or place. For example, the weight data 122 may be affected as a result of the user 112 opening the door 110 and the subsequent air movement 116. The validity data 128 may be determined for the weight data 122 associated with one or more of the shelves 104. For example, if the weight data 122 is from shelf 104(1) and 104(4), the weight data 122 for both may be designed as valid or invalid by the validity data 128. In another example, the weight data 122 from one shelf 104 may be associated with the validity data 128 while the other is not.

In one implementation, the correspondence value may be compared with a threshold value. For example, if the correspondence value is greater than a threshold value, the first weight data 122(1) and the second weight data 122(2) are deemed to be similar enough to one another during the first time interval to be deemed invalid. The validity data 128 comprises information indicative of the validity of the first weight data 122(1) and the second weight data 122(2).

In some implementations, processing may be performed to determine the occurrence of an event may take place before the operations of 606. For example, the weight data 122 may be processed to determine an event, that is some change of the weight data 122. Responsive to the detection of this event, the weight data 122 may be processed as described at 606 to determine the correspondence value.

In some implementations, door status data may be determined based on the correspondence between the first weight data 122(1) and the second weight data 122(2). For example, if the correspondence value exceeds a threshold amount, it may be deemed indicative of a transition in the door configuration.

At 610, interaction data 134 is generated using the weight data designated is valid by the validity data 128. For example, the correspondence value is less than threshold value, the first weight data 122(1) and the second weight data 122(2) may be deemed to be valid. For example, the weight data 122 that has validity data 128 indicating that it is deemed to be valid may be used determine a weight change at a particular shelf 104 or location thereon and produce interaction data 134 indicative of a pick or place of one or more items 106.

The analysis module 126 may assess the weight data 122 from adjacent shelves 104. Adjacent shelves 104 may include those shelves which are immediately adjacent such as one above the other, immediately to the left to right, or diagonally up to the left, diagonally down to the left, and so forth. In some situations, adjacent shelves 104 may include shelves 104 which are on the same rack or gondola, or in a rack or gondola that is nearby. In another implementation, adjacent shelves 104 may include those shelves that are serviced by the same door 110. For example, several shelves 104 may be located on separate gondolas, but are accessed by a single door 110.

The analysis module 126 may use the validity data 128 to perform various actions. For example, the validity data 128 may be transmitted to a server for further use. Continuing the example, one or more of weight data 122 from the shelves 104 associated with the validity data 128 may be transmitted. In another example, the weight data 122 that is associated with validity data 128 that is indicative of validity may be sent to another device such as a server, stored, or otherwise processed. In yet another example, the weight data 122 that is associated with validity data 128 that is indicative of invalidity may be discarded or processed using one or more additional algorithms.

At 612, a quantity of the type of item at the fixture 102 is determined. For example, the interaction data 134 may indicate that a quantity of six cans of frozen juice have been removed from the shelf 104(1), and the quantity on hand may be decreased accordingly.

Figure 7:
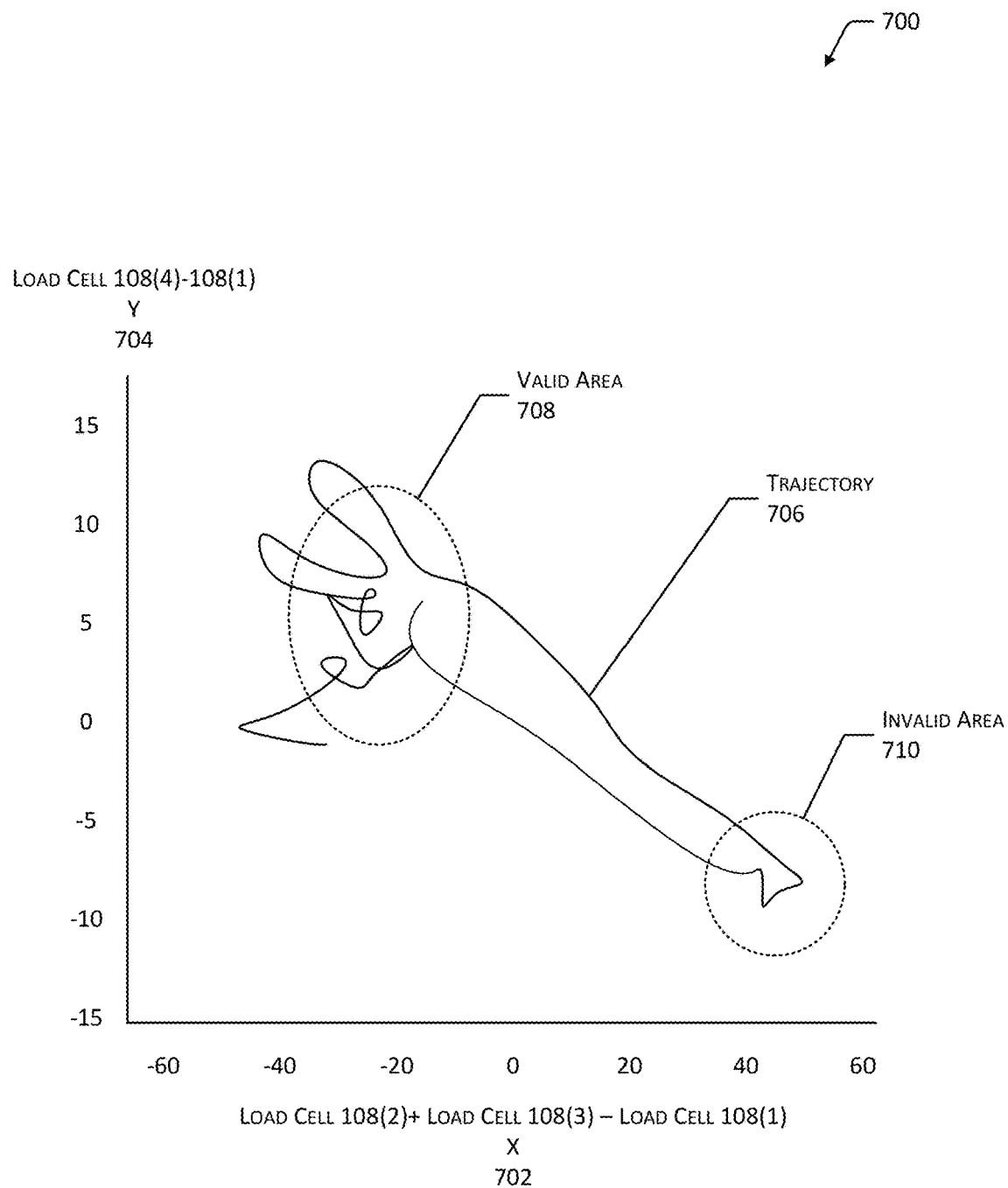
FIG. 7 depicts a graph of a two-dimensional space and a trajectory of an estimated location of a center of mass or other characteristic of a shelf that may be used to determine when weight data from load cells is valid, according to some implementations.

FIG. 7 depicts a graph 700 of a two-dimensional space and a trajectory of an estimated location of a center of mass of a shelf that may be used to determine when weight data from load cells is valid, according to some implementations.

As described above, air movement 116 or other phenomena may affect a shelf 104 in various ways. For example, as the door 110 is opened or closed movement of air may result in pressure being applied to different places on the shelf 104 over time. The weight data 122 may be assessed as described next to determine if the weight data is consistent with valid or invalid data.

A two-dimensional space is depicted having a horizontal axis "x" 702 that comprises values based on Expression 1 and a vertical axis "y" 704 that is based on Expression 2.

| | |
|---|---|
| $Weight_{LC2} + Weight_{LC3} - Weight_{LC1}$ | EXPRESSION 1 |
| $Weight_{LC4} - Weight_{LC1}$ | EXPRESSION 2 |

In these expressions, the weights may comprise weight values 304, LC1 indicates load cell 108(1), LC2 indicates load cell 108(2), LC3 indicates load cell 108(3), and LC4 indicates load cell 108(4). In other implementations, other expressions may be utilized.

In this illustration, a trajectory 706 is depicted. The trajectory 706 represents trajectory data that is indicative of a change within the space over a period of time of the values produced by evaluating Expressions 1 and 2. For example, the results of the expressions may be used to specify a point in the space at a particular time. For example, the trajectory 706 may be a visualization of a time series of data for the values produced by evaluating Expressions 1 and 2. The trajectory 706 does not necessarily correspond to movement in three-dimensional physical space, such as left, right, up, down, forward, and backward.

By utilizing simulation, testing, or other techniques, regions within the space may be designated as being consistent with data that is valid or invalid. For example, a valid area 708 is depicted that corresponds with behavior within the space that is consistent with operation of the load cells 108 not impacted by the effects of air movement 116 and so forth. In comparison, an invalid region 710 within the space is depicted that is consistent with a situation in which the load cells 108 on a particular shelf 104 are producing invalid weight data 122. In a situation where there is erroneous weight data 122, the trajectory 706 may stray into the invalid region 710.

In some implementations, machine learning techniques including, but not limited to, classifiers, artificial neural networks, and so forth may trained to recognize when the trajectory 706 is indicative of valid or invalid data. For example, a machine learning module may be trained using fixture data 118 that includes weight data 122 and the door sensor data 124 obtained from the door sensor 114.

Figure 8:
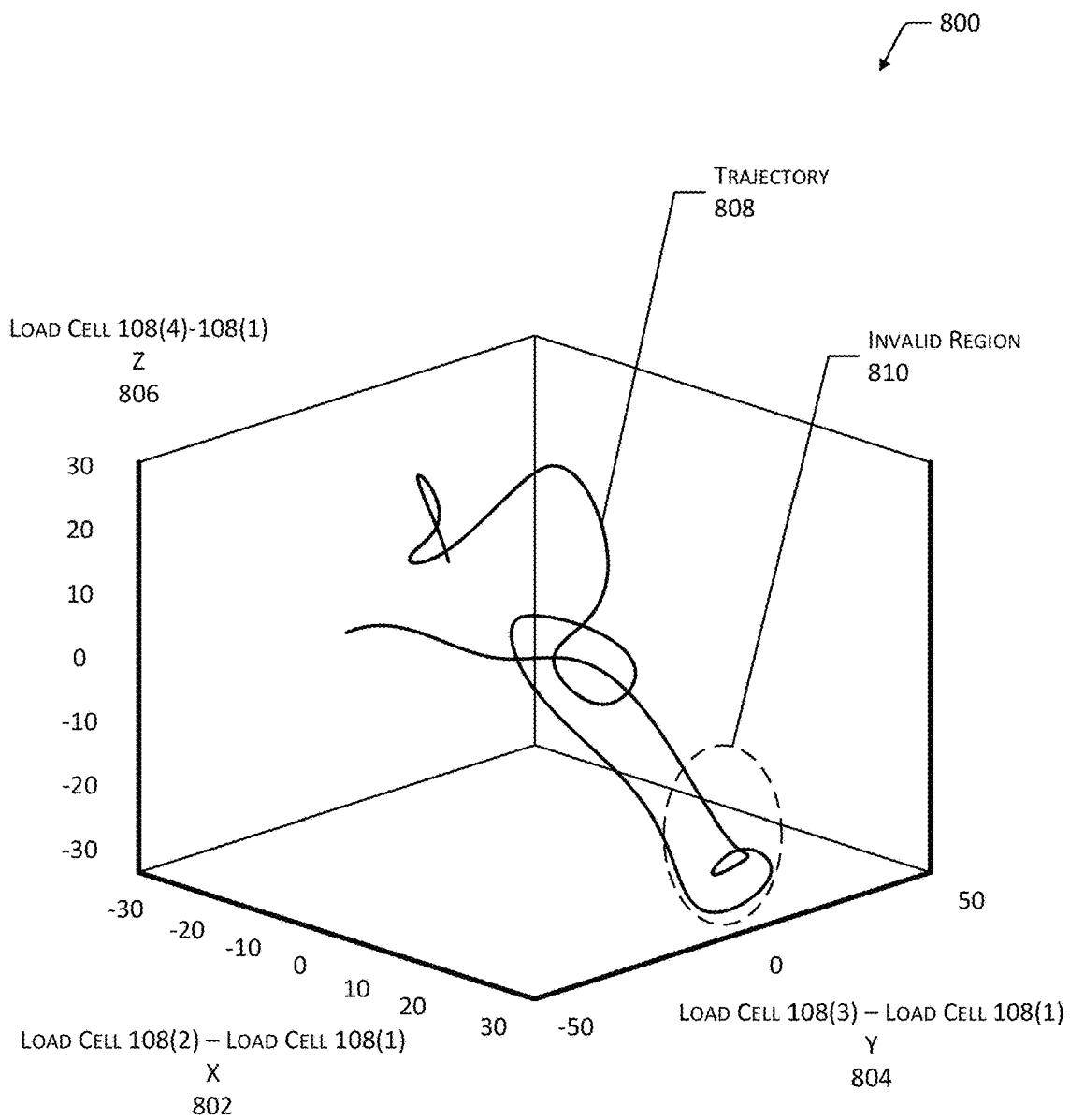
FIG. 8 depicts a graph of a three-dimensional space and a trajectory of an estimated location of a center of mass or other characteristic of a shelf that may be used to determine when weight data from load cells is valid, according to some implementations.

FIG. 8 depicts a graph 800 of a three-dimensional space and a trajectory of an estimated location of a center of mass of a shelf that may be used to determine when weight data from load cells is valid, according to some implementations.

In some implementations, the analysis of the trajectory may be extended into a three-dimensional or greater space. A three-dimensional space is depicted having a first axis "x" 802 that comprises values based on Expression 3, a second axis "y" 804 that is based on Expression 4, and a third axis "y" 806 that is based on Expression 5.

| | |
|---|---|
| $Weight_{LC2} - Weight_{LC1}$ | EXPRESSION 3 |
| $Weight_{LC3} - Weight_{LC1}$ | EXPRESSION 4 |
| $Weight_{LC4} - Weight_{LC1}$ | EXPRESSION 5 |

In these expressions, the weights may comprise weight values 304, LC1 indicates load cell 108(1), LC2 indicates load cell 108(2), LC3 indicates load cell 108(3), and LC4 indicates load cell 108(4). In other implementations, other expressions may be utilized.

In this illustration, a trajectory 808 is depicted. The trajectory 808 represents trajectory data that is indicative of a change within the space over a period of time of the values produced by evaluating Expressions 3, 4, and 5. For example, the results of the expressions may be used to specify a point in the space at a particular time. The trajectory 808 does not necessarily correspond to movement in three-dimensional physical space, such as left, right, up, down, forward, and backward.

Similar to that described above, an invalid region 810 is specified. If the trajectory 808 strays within the invalid region 810, the weight data 122 associated therewith may be deemed to be invalid.

By utilizing simulation, testing, or other techniques, regions within the space may be designated as being consistent with data that is valid or invalid. For example, the invalid region 810 that is depicted corresponds with behavior within the space that is consistent with operation of the load cells 108 impact by the effects of air movement 116 or other phenomena. In a situation where there is erroneous weight data 122, the trajectory 808 may stray into the invalid region 810.

In some implementations, machine learning techniques including, but not limited to, classifiers, artificial neural networks, and so forth may trained to recognize when the trajectory 808 is indicative of valid or invalid data. For example, a machine learning module may be trained using fixture data 118 that includes weight data 122 and the door sensor data 124 obtained from the door sensor 114.

In some implementations, the analysis of the trajectory 706 in the two-dimensional space and the trajectory 808 in the three-dimensional space may be used in conjunction with one another to determine the validity data 128. For example, if both trajectories intrude upon the invalid region 710 and the invalid region 810 respectively, the weight data 122 associated there with may be deemed to be invalid.

Figure 9:
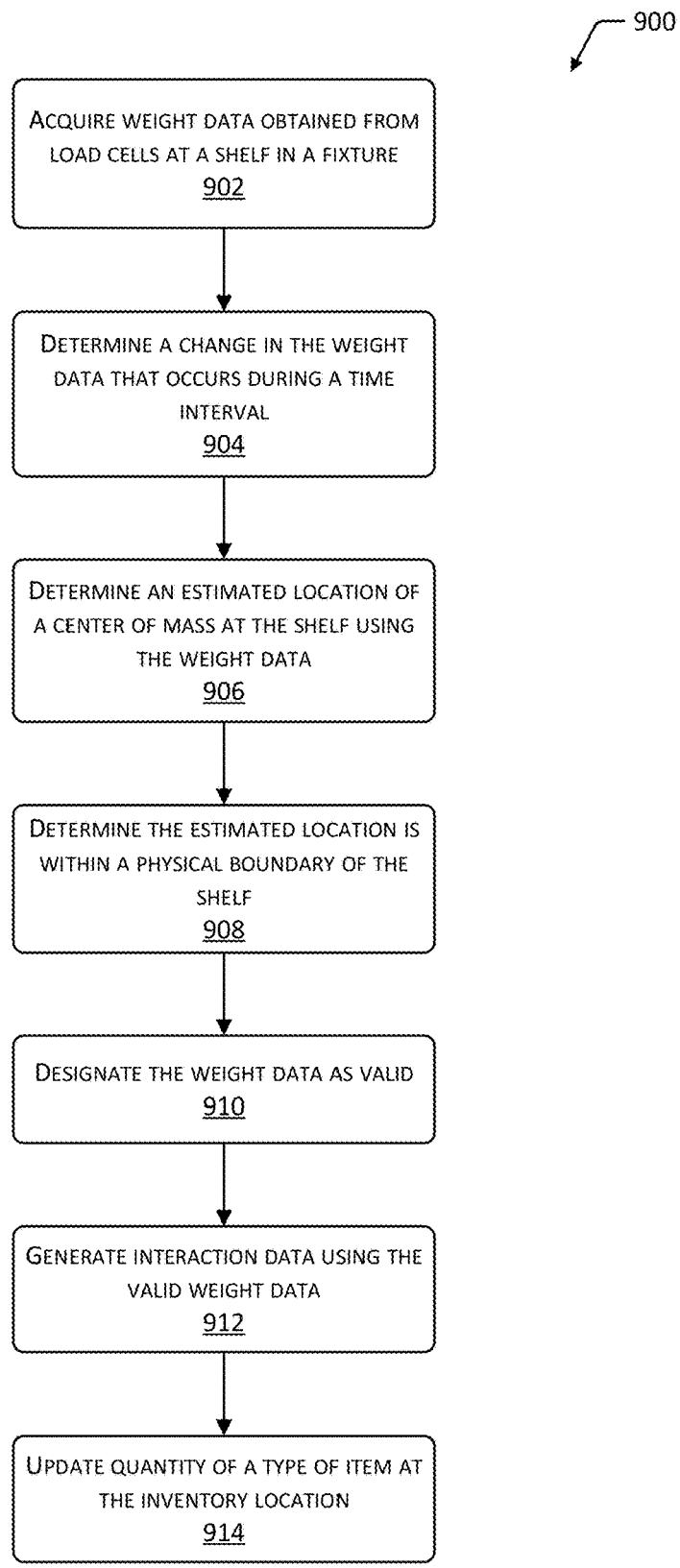
FIG. 9 is a flow diagram illustrating a process that uses an estimated location of a center of mass or other characteristic of a shelf to determine if weight data is valid, according to some implementations.

FIG. 9 is a flow diagram 900 illustrating a process that uses an estimated location of a center of mass 204 of a shelf to determine if weight data is valid, according to some implementations. The process may be implemented at least in part by one or more of the fixture 102, computing devices located at or connected to the fixture 102, the inventory management system 120, and so forth.

As described herein, the effects of phenomena such as air movement 116 may result in changes to the weight data 122 produced by the load cells 108 even in the absence of a pick or place of an item 106. As described above with regard to FIG. 2, the shelf 104 exhibits an estimated location of a center of mass 204 that may be calculated using the weight data 122 available at a particular time that was obtained from load cells 108 of that particular shelf 104. The air movement 116 or other phenomena may result in the estimated location of center of mass 204 to depart from its actual position and temporarily be located beyond the physical boundary of the shelf. For example, a gust of air may impact the front edge of the shelf 104, increasing the force measured by the load cells 108(2) and 108(3) that are located on the front of the shelf 104. This increase may result in the estimated location of the center of mass 204 shifting to a point that is several inches beyond the front edge of the shelf 104. As the force of the impact by the air movement 116 dissipates, the estimated location of the center of mass 204 may return to approximately the same location as it was prior to the door 110 opening.

At 902, weight data 122 is acquired from the load cells 108 at a shelf 104 in the fixture 102.

At 904, a change in the weight data 122 that occurs during a time interval is determined. For example, an event detection module may process the weight data 122.

At 906, an estimated location at the shelf 104 is determined using the weight data 122. For example, the estimated location may be indicative of a center of mass, a location of a weight change, and so forth.

At 908, the estimated location is determined to be within a physical boundary of the shelf 104. For example, the estimated location may be somewhere within the boundary of the edges of the shelf 104.

At 910, the weight data 122 is deemed to be valid. For example, validity data 128 may be generated that is indicative of the weight data 122 associated with the time interval being valid.

At 912, interaction data 134 is generated using the weight data 122. The interaction data 134 may be indicative of one or more of a pick or place of a type of item to or from the shelf 104, or other portion of the fixture 102. For example, the weight data 122 that has validity data 128 indicating that it is deemed to be valid may be used determine a weight change at a particular shelf 104 or location thereon and produce interaction data 134 indicative of a pick or place of one or more items 106.

At 914, a quantity of the type of item at the fixture 102 is determined. For example, the interaction data 134 may indicate that a quantity of six cans of frozen juice have been added to the shelf 104(1), and the quantity on hand may be increased accordingly.

In the event that the estimated location is determined to be outside of the physical boundary of the shelf 104, the validity data 128 may be indicative of the weight data 122 being invalid.

By utilizing this process, the inventory management system 120 may determine the validity of the weight data 122 may act accordingly, such as by utilizing valid weight data 122 and disregarding invalid weight data 122.

In some implementations, door status data may be generated based on this process. For example, the occurrence of the estimated location of the center of mass 204 at a location beyond the boundary of the shelf 104 may be deemed to be indicative of a change in configuration of the door 110.

Several of the techniques described herein may be combined. For example, the determination of the correspondence value may be combined with the process 900 to determine the validity data 128. Continuing the example, if within a specified interval of time the correspondence value exceeds a threshold value and the estimated location of the center of mass 204 is outside of the physical boundary of the shelf 104, the weight data 122 may be deemed to be invalid.

Figure 10:
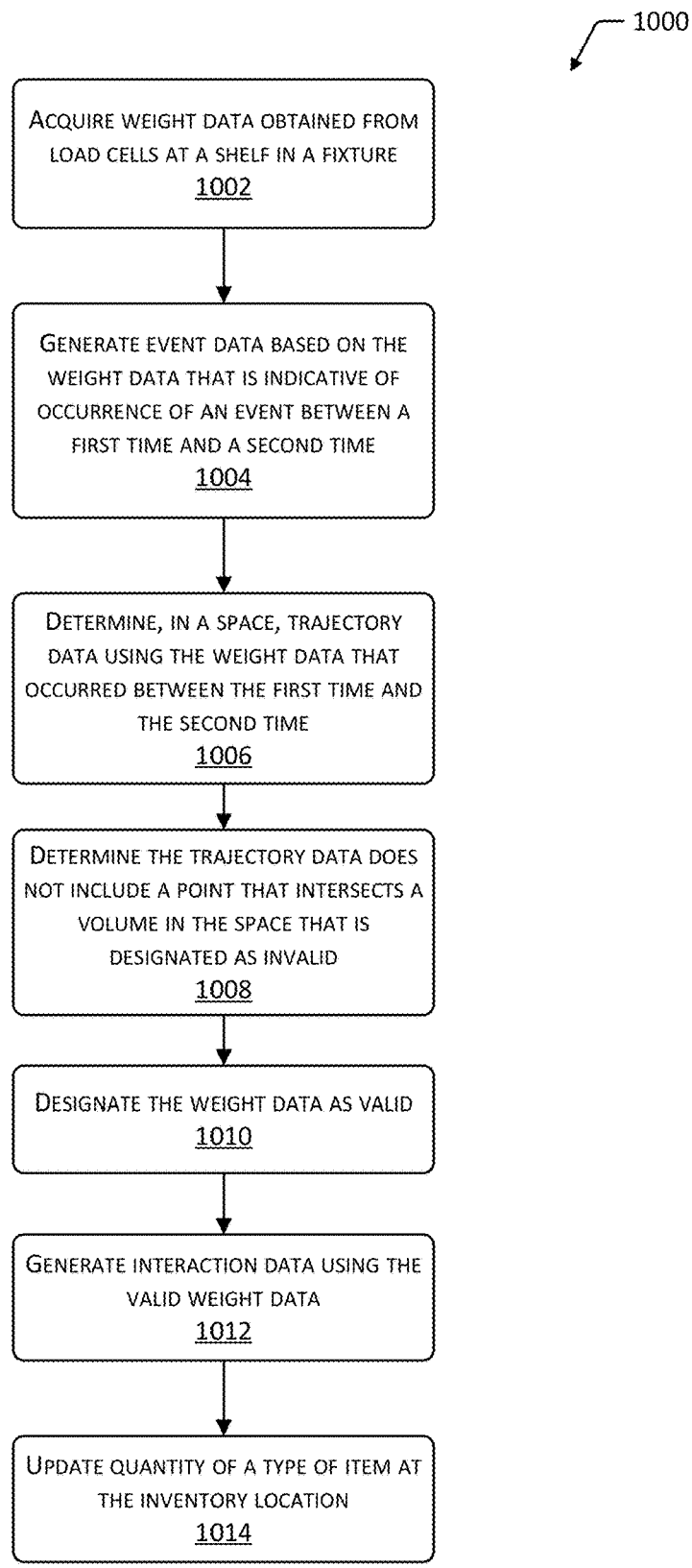
FIG. 10 is a flow diagram illustrating a process that uses a trajectory based on weight data from load cells at a shelf to determine if weight data is valid, according to some implementations.

FIG. 10 is a flow diagram 1000 illustrating a process that uses a trajectory based on weight data 122 to determine if weight data is valid, according to some implementations.

As described above with regard to FIGS. 7 and 8, trajectories may be determined in two-dimensional and three-dimensional spaces based on the weight data 122. These trajectories may be analyzed to determine if the weight data 122 is valid or invalid.

At 1002, weight data 122 is obtained from load cells 108 at a shelf 104 in the fixture 102.

At 1004, event data based on the weight data 122 may be generated that is indicative of an occurrence of an event between a first time and the second time.

At 1006, trajectory data is determined in a space using the weight data 122 that occurred between the first time and second time. For example, one or more of the trajectory data represented by the trajectory 706 in the two-dimensional space may be determined, the trajectory data represented by the trajectory 808 in the three-dimensional space be determined, or both.

As described above, in the two-dimensional space the trajectory data of the trajectory 706 may be calculated using Expressions 1 and 2 while in the three-dimensional space the trajectory data represented by trajectory 808 may be calculated using Expressions 1, 2, and 3.

At 1008, one or more points in the trajectory data that correspond to an interval between the first time and the second time are determined to not intersect a region within the space that is designated as invalid.

At 1010, the weight data 122 that occurs between the first time and the second time is designated as being valid.

In the event the points in the trajectory do intersect a region (such as an area or volume within the space) that is designated as invalid, the weight data 122 that occurs between the first time and second time is designated as being invalid.

At 1012, interaction data 134 is generated using the valid weight data 122. The interaction data 134 may be indicative of one or more of a pick or place of a type of item to or from the shelf 104, or other portion of the fixture 102. For example, the weight data 122 that has validity data 128 indicating that it is deemed to be valid may be used determine a weight change at a particular shelf 104 or location thereon and produce interaction data 134 indicative of a pick or place of one or more items 106.

At 1014, a quantity of the type of item at the fixture 102 is determined. For example, the interaction data 134 may indicate that a quantity of six bags of frozen peas have been added to the shelf 104(1), and the quantity on hand may be increased accordingly.

Figure 11:
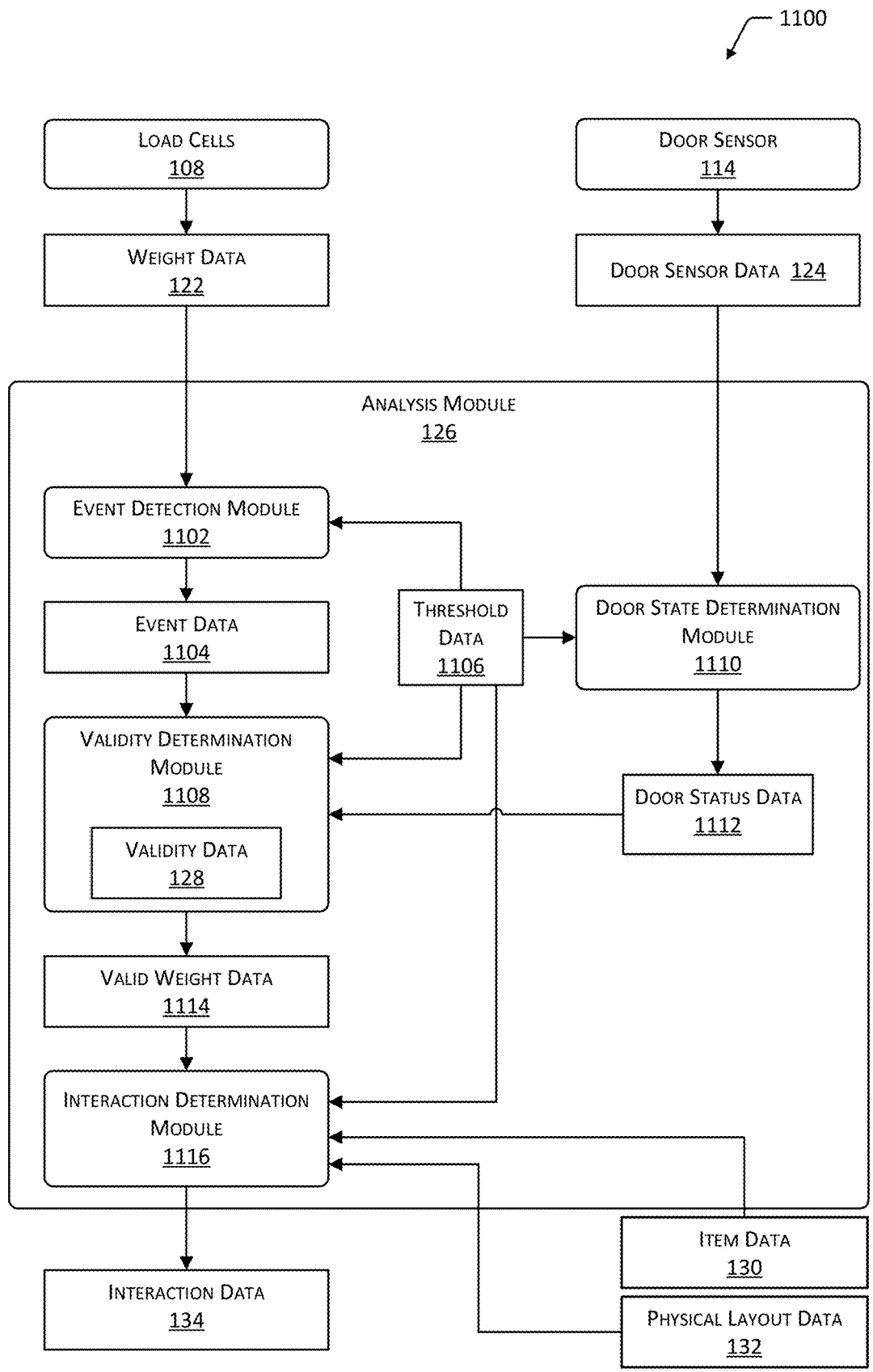
FIG. 11 is a block diagram of a module to determine validity of weight data from load cells, according to some implementations.

FIG. 11 is a block diagram 1100 of the analysis module 120 configured to determine validity of weight data from load cells, according to some implementations.

The load cells 108 generate weight data 122. An event detection module 1102 may be used to generate event data 1104. One or more change detection algorithms may be used to identify when the weight values have changed in such a way as to meet or exceed a threshold value, such as specified by threshold data 1106. For example, the event may be determined using a cumulative sum (CUSUM) function. An event may include weight data 122 that begins at a start time and continues through an end time.

The event data 1104 in some implementations may comprise a subset of the weight data 122. For example, the event data 1104 may comprise weight data 122 that is been determined to include some change in values.

One or more door sensors 114 may generate door sensor data 124. The door sensor data one and 24 may be provided to a door state determination module 1110. The door state determination module 1110 is configured to generate door status data 1112. The door status data 1112 is indicative of one or more of the configuration of the door 110, the angle at which the door 110 is open, and so forth. For example, the door status data 1112 may comprise a single bit value in which a zero is indicative of the door being closed and a one is indicative of the door being opened. In another example, door status data 1112 may indicate that the door is open halfway, or at an angle of 105°, and so forth. In some implementations, the door state determination module 1110 may be configured to determine a transition from one state to another, and generate door status data 1112 indicative of this transition. For example, the door state determination module 1110 may generate door state data 1112 that is indicative of the door transitioning from a closed to an open state at a particular time.

The door state determination module 1110 may be configured to generate door state determination module 1110 using other techniques. For example, one or more of the techniques involving determination of the correspondence between weight data 122 from different shelves, the estimated location of center of mass, the trajectory determination, and so forth may be used to generate door status data 1112 in the absence of a door sensor 114, or when a door sensor 114 is non-functional. In implementations in which the door status data 1112 is generated without the use of door sensor data 124, the door status data 1112 may include a confidence value or other data indicative of a likelihood that the door status data 1112 accurately represents the situation of the door 110. If the confidence value is less than a threshold value, the fixture data 118 may be provided to a human operator to make a determination as to the door status data 1112.

The door status data 1112 may then be used as described by the validity determination module 1108, or by other modules. For example, a maintenance module (not shown) may utilize the door status data 1112 to determine if a particular door 110 has been left open for longer than a threshold amount of time, and dispatch an agent to close the door 110.

The event data 1104 may be processed by a validity determination module 1108. The validity determination module 1108 may utilize one or more of the techniques or processes described herein to generate the validity data 128, either alone or in various combinations. The validity determination module 108 may access one or more threshold values specified by the threshold data 1106.

In one implementation, the door status data 1112 may be provided to the validity determination module 1108. For example, as described above with regard to FIGS. 3 and 4, the door status data 1112 may be used to indicate if the door 110 is open or close, and validity data 128 may be determined based at least in part on the door status data 1112.

In another implementation, the validity determination module 1108 may be configured to generate correspondence value using the weight data 122 from a plurality of the shelves. In yet another implementation, the validity determination module 1108 may be configured to determine the estimated center of mass 204 is outside of a physical boundary of the shelf. In still another implementation, the validity determination module 1108 may generate one or more multidimensional trajectories based on the weight data 122.

The validity determination module 1108 may provide as output valid weight data 1114. The valid weight data 1114 may comprise the event data 1104 or the weight data 122 that is associated with validity data 128 indicative of valid data. For example, valid weight data 1114 may comprise weight data obtained during the valid time window 318.

An interaction determination module 1116 may use a valid weight data 1114 as input. The interaction determination module 116 may access one or more thresholds specified by the threshold data 1106. The interaction determination module 116 may access one or more of the item data 130, the physical layout data 132, and so forth during operation. The interaction determination module 1116 may use the valid weight data 1114 to determine the fixture 102, shelf 104, lane within the shelf, and so forth associated with a weight change resulting from a pick or place of one or more items 106. As described above, the item data 130 provides information such as the weight of an individual item, the physical layout data 132 associates a particular lane or location on the shelf 104 with that particular item 106.

By using the valid weight data 1114 to determine a change in weight and a lane or other location on the shelf 104 so she with that change in weight, the interaction data 134 may be generated. For example, the interaction data 134 may indicate that a quantity of one can of frozen orange juice was removed from shelf 104(1) at a particular time. By utilizing the techniques described herein to determine the validity data 128 and by avoiding the use of invalid weight data 122, overall performance of the system is improved and the system may operate more efficiently.

Furthermore, by utilizing the valid weight data 1114, the system may minimize or avoid altogether workflows that involves sending at least a portion of the data obtained from one or more of the sensors in the facility to a human operator or a more computationally intensive processing system. Without the validity determination module 1108, events that have been deemed to have a low confidence, or the interaction data 134 based on that low confidence weight data 122, be provided to a human operator who then makes a determination as to what actually occurred at the facility. By using the techniques described herein, this manual processing by human operator may be significantly reduced or limited altogether.

Figure 12:
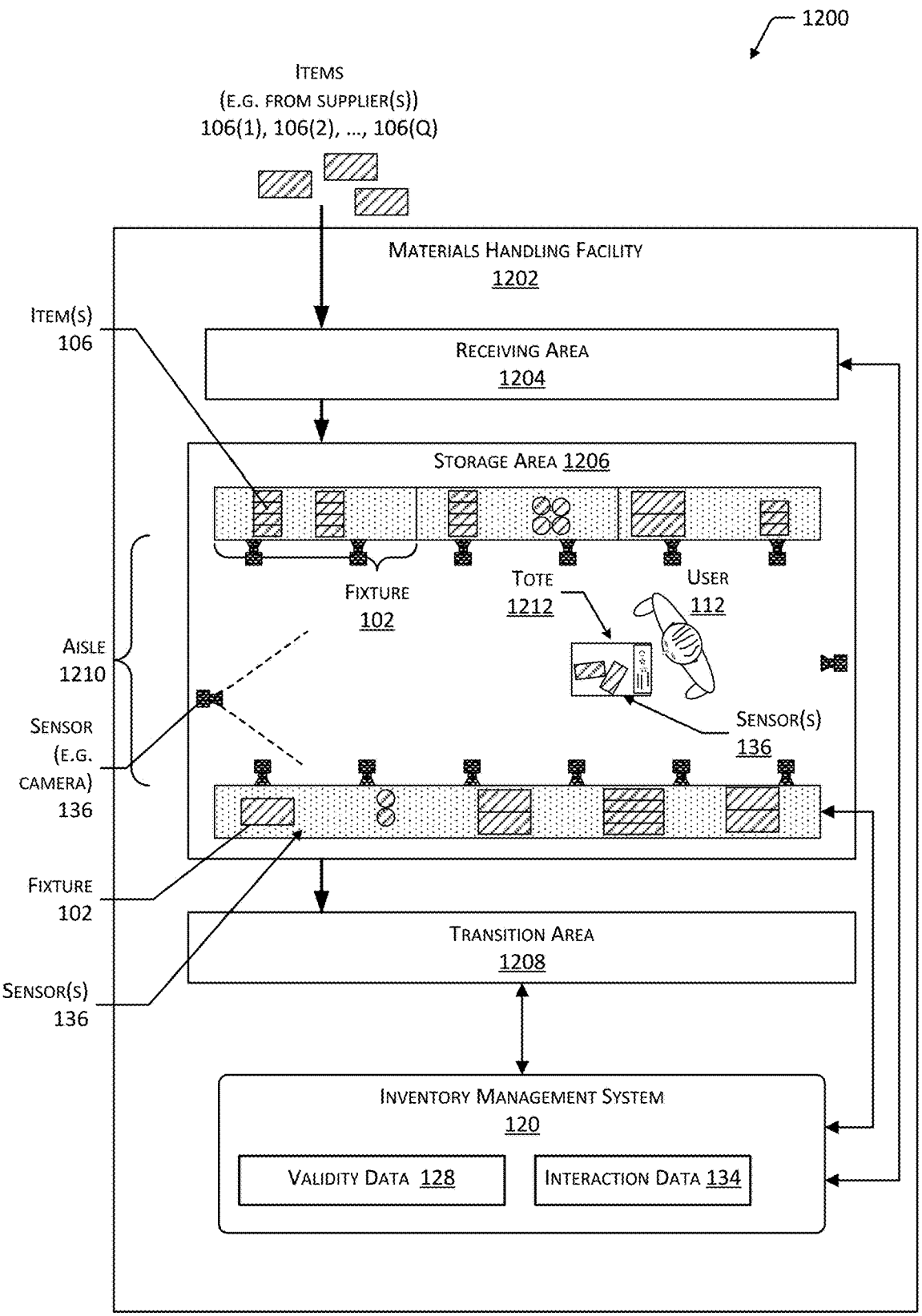
FIG. 12 is a block diagram illustrating a materials handling facility (facility) using the system, according to some implementations.

FIG. 12 is a block diagram 1200 illustrating a materials handling facility (facility) 1202 using the system 100, according to some implementations. A facility 1202 comprises one or more physical structures or areas within which one or more items 106(1), 108(2), . . . , 108(Q) may be held. As used in this disclosure, letters in parenthesis such as "(Q)" indicate an integer value greater than or equal to zero. The items 106 may comprise physical goods, such as books, pharmaceuticals, repair parts, electronic gear, and so forth.

The facility 1202 may include one or more areas designated for different functions with regard to inventory handling. In this illustration, the facility 1202 includes a receiving area 1204, a storage area 1206, and a transition area 1208.

The receiving area 1204 may be configured to accept items 106, such as from suppliers, for intake into the facility 1202. For example, the receiving area 1204 may include a loading dock at which trucks or other freight conveyances unload the items 106. In some implementations, the items 106 may be processed, such as at the receiving area 1204, to generate at least a portion of the item data 130. For example, an item 106 may be imaged or otherwise scanned to develop reference images or representations of the item 106 at the receiving area 1204.

The storage area 1206 is configured to store the items 106. The storage area 1206 may be arranged in various physical configurations. In one implementation, the storage area 1206 may include one or more aisles 1210. The aisle 1210 may be configured with, or defined by, fixtures 102 on one or both sides of the aisle 1210. The fixtures 102 may include one or more of a fixture 102, a rack, a case, a cabinet, a bin, a floor location, or other suitable storage mechanisms for holding, supporting, or storing the items 106. For example, the fixtures 102 may comprise shelves 102 with partitioned areas 202 designated therein. The fixtures 102 may be affixed to the floor or another portion of the structure of the facility 1202. The fixtures 102 may also be movable such that the arrangements of aisles 1210 may be reconfigurable. In some implementations, the fixtures 102 may be configured to move independently of an outside operator. For example, the fixtures 102 may comprise a rack with a power source and a motor, operable by a computing device to allow the rack to move from one location within the facility 1202 to another.

One or more users 112(1), 110(2), . . . , 110(U) and totes 1212(1), 1214(2), . . . , 1214(T) or other material handling apparatus may move within the facility 1202. For example, the user 112 may move about within the facility 1202 to pick or place the items 106 in various fixtures 102, placing them on the tote 1212 for ease of transport. The tote 1212 is configured to carry or otherwise transport one or more items 106. For example, the tote 1212 may include a basket, cart, bag, bin, and so forth. In other implementations, other material handling apparatuses such as robots, forklifts, cranes, aerial drones, and so forth, may move about the facility 1202 picking, placing, or otherwise moving the items 106. For example, a robot may pick an item 106 from a first fixture 102(1) and move the item 106 to a second fixture 102(2).

One or more sensors 136 may be configured to acquire information in the facility 1202. The sensors 136 may include, but are not limited to, camera 136(1), depth sensors 136(2), load cells 108, optical sensor arrays 124(13), proximity sensors 136(6), and so forth. The sensors 136 may be stationary or mobile, relative to the facility 1202. For example, the fixtures 102 may contain load cells 108 to generate weight signals 1202, cameras 136(1) to acquire images of picking or placement of items 106 on shelves 102, optical sensor arrays 124(13) to detect shadows of the user's 110 hands at the fixtures 102, and so forth. In another example, the facility 1202 may include a camera 136(1) to obtain images of the user 112 or other objects in the facility 1202. The sensors 136 are discussed in more detail below with regard to FIG. 13.

While the storage area 1206 is depicted as having one or more aisles 1210, fixtures 102 storing the items 106, sensors 136, and so forth, it is understood that the receiving area 1204, the transition area 1208, or other areas of the facility 1202 may be similarly equipped. Furthermore, the arrangement of the various areas within the facility 1202 is depicted functionally rather than schematically. For example, in some implementations, multiple different receiving areas 1204, storage areas 1206, and transition areas 1208 may be interspersed rather than segregated in the facility 1202.

The facility 1202 may include, or be coupled to, an inventory management system 120. The inventory management system 120 is configured to interact with users 112 or devices such as sensors 136, robots, material handling equipment, computing devices, and so forth, in one or more of the receiving area 1204, the storage area 1206, or the transition area 1208.

During operation of the facility 1202, the sensors 136 may be configured to provide sensor data, or information based on the sensor data, to the inventory management system 120. The sensor data may include image data, non-image data, weight data 122 obtained from load cells 108, and so forth. The sensors 136 are described in more detail below with regard to FIG. 13.

The inventory management system 120 or other systems may use the sensor data to track the location of objects within the facility 1202, movement of the objects, or provide other functionality. Objects may include, but are not limited to, items 106, users 112, totes 1212, and so forth. For example, a series of images acquired by the camera 136(1) may indicate removal by the user 112 of an item 106 from a particular location on the fixture 102 and placement of the item 106 on or at least partially within the tote 1212.

The facility 1202 may be configured to receive different kinds of items 106 from various suppliers and to store them until a customer orders or retrieves one or more of the items 106. A general flow of items 106 through the facility 1202 is indicated by the arrows of FIG. 12. Specifically, as illustrated in this example, items 106 may be received from one or more suppliers, such as manufacturers, distributors, wholesalers, and so forth, at the receiving area 1204. In various implementations, the items 106 may include merchandise, commodities, perishables, or any suitable type of item 106, depending on the nature of the enterprise that operates the facility 1202.

Upon being received from a supplier at the receiving area 1204, the items 106 may be prepared for storage in the storage area 1206. For example, in some implementations, items 106 may be unpacked or otherwise rearranged. The inventory management system 120 may include one or more software applications executing on a computer system to provide inventory management functions. These inventory management functions may include maintaining information indicative of the type, quantity, condition, cost, location, weight, or any other suitable parameters with respect to the items 106. The items 106 may be stocked, managed, or dispensed in terms of countable units, individual units, or multiple units, such as packages, cartons, crates, pallets, or other suitable aggregations. Alternatively, some items 106, such as bulk products, commodities, and so forth, may be stored in continuous or arbitrarily divisible amounts that may not be inherently organized into countable units. Such items 106 may be managed in terms of a measurable quantity such as units of length, area, volume, weight, time, duration, or other dimensional properties characterized by units of measurement. Generally speaking, a quantity of an item 106 may refer to either a countable number of individual or aggregate units of an item 106 or a measurable amount of an item 106, as appropriate.

After arriving through the receiving area 1204, items 106 may be stored within the storage area 1206. In some implementations, like items 106 may be stored or displayed together in the fixtures 102 such as in bins, on shelves 102, hanging from pegboards, and so forth. In this implementation, all items 106 of a given kind are stored in one fixture 102. In other implementations, like items 106 may be stored in different fixtures 102. For example, to optimize retrieval of certain items 106 having frequent turnover within a large physical facility 1202, those items 106 may be stored in several different fixtures 102 to reduce congestion that might occur at a single fixture 102.

When a customer order specifying one or more items 106 is received, or as a user 112 progresses through the facility 1202, the corresponding items 106 may be selected or "picked" from the fixtures 102 containing those items 106. In various implementations, item picking may range from manual to completely automated picking. For example, in one implementation, a user 112 may have a list of items 106 they desire and may progress through the facility 1202 picking items 106 from fixtures 102 within the storage area 1206 and placing those items 106 into a tote 1212. In other implementations, employees of the facility 1202 may pick items 106 using written or electronic pick lists derived from customer orders. These picked items 106 may be placed into the tote 1212 as the employee progresses through the facility 1202.

After items 106 have been picked, the items 106 may be processed at a transition area 1208. The transition area 1208 may be any designated area within the facility 1202 where items 106 are transitioned from one location to another or from one entity to another. For example, the transition area 1208 may be a packing station within the facility 1202. When the item 106 arrives at the transition area 1208, the items 106 may be transitioned from the storage area 1206 to the packing station. Information about the transition may be maintained by the inventory management system 120.

In another example, if the items 106 are departing the facility 1202, a list of the items 106 may be obtained and used by the inventory management system 120 to transition responsibility for, or custody of, the items 106 from the facility 1202 to another entity. For example, a carrier may accept the items 106 for transport with that carrier accepting responsibility for the items 106 indicated in the list. In another example, a user 112 may purchase or rent the items 106 and remove the items 106 from the facility 1202. During use of the facility 1202, the user 112 may move about the facility 1202 to perform various tasks, such as picking or placing the items 106 in the fixtures 102.

To facilitate operation of the facility 1202, the inventory management system 120 is configured to use the sensor data including the weight data 122 and other information such as the item data 130, the physical layout data 132, the non-weight data 1430, and so forth, to generate interaction data 134.

The interaction data 134 may provide information about an interaction, such as a pick of an item 106 from the fixture 102, a place of an item 106 to the fixture 102, a touch made to an item 106 at the fixture 102, a gesture associated with an item 106 at the fixture 102, and so forth. The interaction data 134 may include one or more of the type of interaction, interaction location identifier indicative of where from the fixture 102 the interaction took place, item identifier, quantity change to the item 106, user identifier, and so forth. The interaction data 134 may then be used to further update the item data 130. For example, the quantity of items 106 on hand at a particular partitioned area 202 on the fixture 102 may be changed based on an interaction that picks or places one or more items 106.

The inventory management system 120 may combine or otherwise utilize data from different sensors 136 of different types, including the load cells 108. For example, weight data 122 obtained from load cells 108 at the fixture 102 may be used in conjunction with non-weight data 1430 such as the image data to determine the interaction data 134.

Figure 13:
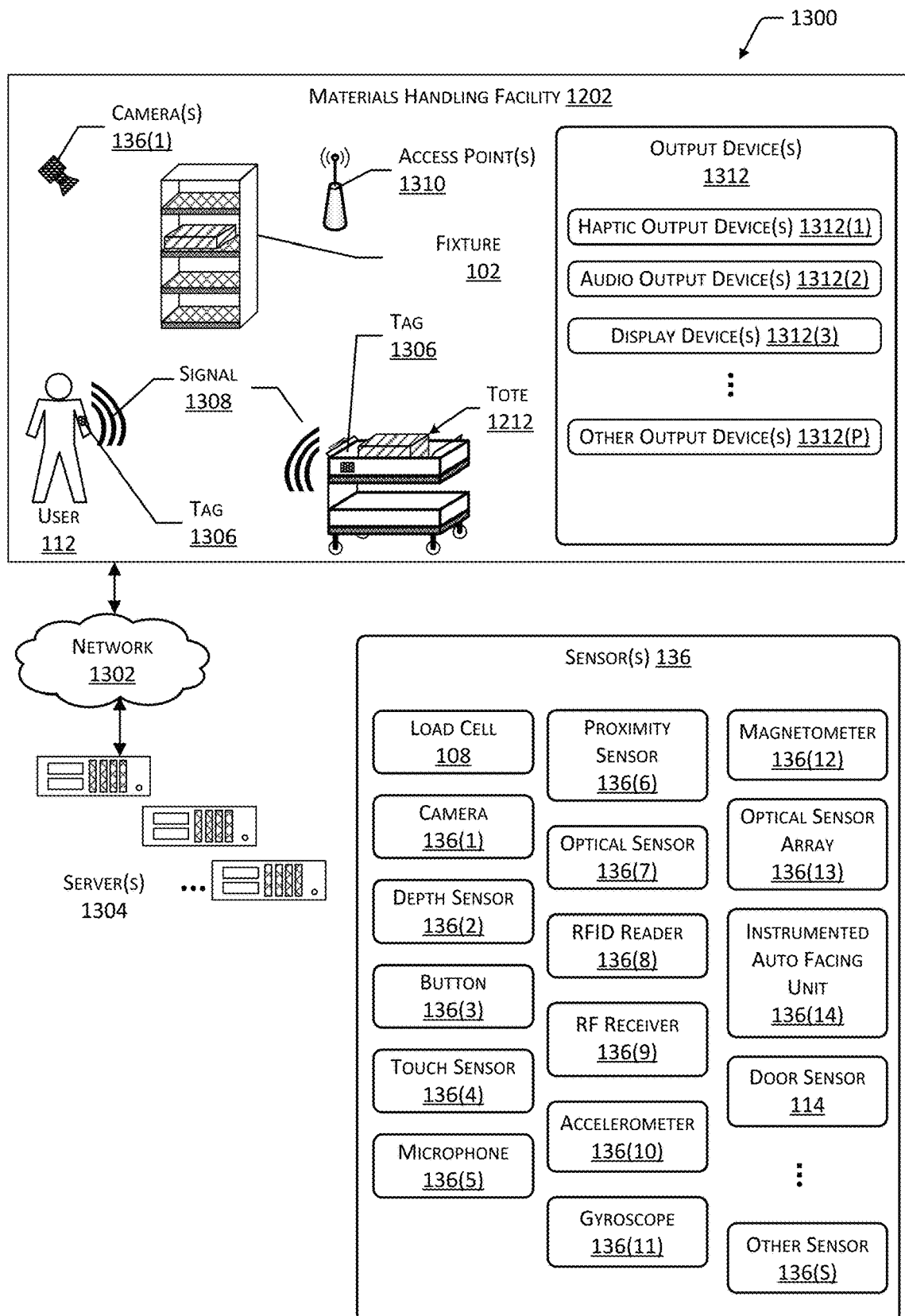
FIG. 13 is a block diagram illustrating additional details of the facility, according to some implementations.

FIG. 13 is a block diagram 1300 illustrating additional details of the facility 1202, according to some implementations. The facility 1202 may be connected to one or more networks 1302, which in turn connect to one or more servers 1304. The network 1302 may include private networks such as an institutional or personal intranet, public networks such as the Internet, or a combination thereof. The network 1302 may utilize wired technologies (e.g., wires, fiber optic cables, and so forth), wireless technologies (e.g., radio frequency, infrared, acoustic, optical, and so forth), or other connection technologies. The network 1302 is representative of any type of communication network, including one or more of data networks or voice networks. The network 1302 may be implemented using wired infrastructure (e.g., copper cable, fiber optic cable, and so forth), a wireless infrastructure (e.g., cellular, microwave, satellite, and so forth), or other connection technologies.

The servers 1304 may be configured to execute one or more modules or software applications associated with the inventory management system 120 or other systems. While the servers 1304 are illustrated as being in a location outside of the facility 1202, in other implementations, at least a portion of the servers 1304 may be located at the facility 1202. The servers 1304 are discussed in more detail below with regard to FIG. 14.

The users 112, the totes 1212, or other objects in the facility 1202 may be equipped with one or more tags 1306. The tags 1306 may be configured to emit a signal 1308. In one implementation, the tag 1306 may be a radio frequency identification (RFID) tag 1306 configured to emit a RF signal 1308 upon activation by an external signal. For example, the external signal may comprise a radio frequency signal or a magnetic field configured to energize or activate the RFID tag 1306. In another implementation, the tag 1306 may comprise a transmitter and a power source configured to power the transmitter. For example, the tag 1306 may comprise a Bluetooth® Low Energy (BLE) transmitter and battery. In other implementations, the tag 1306 may use other techniques to indicate presence of the tag 1306. For example, an acoustic tag 1306 may be configured to generate an ultrasonic signal 1308, which is detected by corresponding acoustic receivers. In yet another implementation, the tag 1306 may be configured to emit an optical signal 1308.

The inventory management system 120 may be configured to use the tags 1306 for one or more of identification of the object, determining a location of the object, and so forth. For example, the users 112 may wear tags 1306, the totes 1212 may have tags 1306 affixed, and so forth, which may be read and, based at least in part on signal strength, used to determine identity and location.

Generally, the inventory management system 120 or other systems associated with the facility 1202 may include any number and combination of input components, output components, and servers 1304.

The one or more sensors 136 (including the load cells 108) may be arranged at one or more locations within the facility 1202. For example, the sensors 136 may be mounted on or within a floor, wall, at a ceiling, at a fixture 102, on a tote 1212, may be carried or worn by a user 112, and so forth.

The sensors 136 may include one or more load cells 108. One or more load cells 108 are configured to measure the weight of a load, such as the item 106, the tote 1212, or other objects. The load cells 108 may be configured to measure the weight of the load at one or more of the fixtures 102, the tote 1212, on the floor of the facility 1202, and so forth. For example, the fixture 102 may include a plurality of partitioned areas 202 or platforms, with one or more load cells 108 beneath each one to provide weight signals 1202 about an individual partitioned area 202 or platform. The load cells 108 may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of load cells 108 may operate as transducers that generate one or more signals based on an applied force, such as that of the load due to gravity. For example, the load cell 108 may comprise a load cell having a strain gauge and a structural member that deforms slightly when weight is applied. By measuring a change in the electrical characteristic of the strain gauge, such as capacitance or resistance, the weight may be determined. In another example, the load cell 108 may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 120 may use the data acquired by the load cells 108 to identify an object, determine a change in the quantity of objects, determine a location of an object, maintain shipping records, and so forth.

The sensors 136 may include one or more cameras 136(1) or other imaging sensors. The one or more cameras 136(1) may include imaging sensors configured to acquire images of a scene. The cameras 136(1) are configured to detect light in one or more wavelengths including, but not limited to, terahertz, infrared, visible, ultraviolet, and so forth. The one or more cameras 136(1) may comprise charge coupled devices (CCD), complementary metal oxide semiconductor (CMOS) devices, microbolometers, and so forth. The inventory management system 120 may use image data acquired by the one or more cameras 136(1) during operation of the facility 1202. For example, the inventory management system 120 may identify items 106, users 112, totes 1212, and so forth, based at least in part on their appearance within the image data acquired by the one or more cameras 136(1). The one or more cameras 136(1) may be mounted in various locations within the facility 1202. For example, a camera 136(1) may be mounted overhead, on fixtures 102, may be worn or carried by users 112, may be affixed to totes 1212, and so forth.

One or more depth sensors 136(2) may also be included in the sensors 136. The depth sensors 136(2) are configured to acquire spatial or three-dimensional (3D) data, such as depth information, about objects within a field of view. The depth sensors 136(2) may include range cameras, lidar systems, sonar systems, radar systems, structured light systems, stereo vision systems, optical interferometry systems, and so forth. The inventory management system 120 may use the 12D data acquired by the depth sensors 136(2) to identify objects, determine a location of an object in 12D real space, and so forth. One or more buttons 124(3) may be configured to accept input from the user 112. The buttons 124(3) may comprise mechanical, capacitive, optical, or other mechanisms. For example, the buttons 124(3) may comprise mechanical switches configured to accept an applied force from a touch of the user 112 to generate an input signal. The inventory management system 120 may use data from the buttons 124(3) to receive information from the user 112. For example, the tote 1212 may be configured with a button 124(3) to accept input from the user 112 and send information indicative of the input to the inventory management system 120.

The sensors 136 may include one or more touch sensors 136(4). The touch sensors 136(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 120 may use data from the touch sensors 136(4) to receive information from the user 112. For example, the touch sensor 136(4) may be integrated with the tote 1212 to provide a touchscreen with which the user 112 may select from a menu one or more particular items 106 for picking, enter a manual count of items 106 at a fixture 102, and so forth.

One or more microphones 124(5) may be configured to acquire information indicative of sound present in the environment. In some implementations, arrays of microphones 124(5) may be used. These arrays may implement beamforming techniques to provide for directionality of gain. The inventory management system 120 may use the one or more microphones 124(5) to acquire information from acoustic tags 1306, accept voice input from the users 112, determine ambient noise level, and so forth.

The sensors 136 may include proximity sensors 136(6) used to determine presence of an object, such as the user 112, the tote 1212, and so forth. The proximity sensors 136(6) may use optical, electrical, ultrasonic, electromagnetic, or other techniques to determine a presence of an object. In some implementations, the proximity sensors 136(6) may use an optical emitter and an optical detector to determine proximity. For example, an optical emitter may emit light, a portion of which may then be reflected by the object back to the optical detector to provide an indication that the object is proximate to the proximity sensor 136(6). In other implementations, the proximity sensors 136(6) may comprise a capacitive proximity sensor 136(6) configured to provide an electrical field and determine a change in electrical capacitance due to presence or absence of an object within the electrical field.

The proximity sensors 136(6) may be configured to provide sensor data indicative of one or more of a presence or absence of an object, a distance to the object, or characteristics of the object. An optical proximity sensor 136(6) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 136 such as a camera 136(1). Based on an apparent distance between the features of the structured light pattern, the distance to the object may be calculated. Other techniques may also be used to determine distance to the object. In another example, the color of the reflected light may be used to characterize the object, such as skin, clothing, tote 1212, and so forth.

The sensors 136 may include one or more optical sensors 136(7). The optical sensors 136(7) may be configured to provide data indicative of one or more of color or intensity of light impinging thereupon. For example, the optical sensor 136(7) may comprise a photodiode and associated circuitry configured to generate a signal or data indicative of an incident flux of photons. As described below, the optical sensor array 124(13) may comprise a plurality of the optical sensors 136(7). For example, the optical sensor 136(7) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 136(7) may be used. The optical sensors 136(7) may be sensitive to one or more of infrared light, visible light, or ultraviolet light. For example, the optical sensors 136(7) may be sensitive to infrared light, and infrared light sources such as LEDs may provide illumination.

The optical sensors 136(7) may include photodiodes, photoresistors, photovoltaic cells, quantum dot photoconductors, bolometers, pyroelectric infrared detectors, and so forth. For example, the optical sensor 136(7) may use germanium photodiodes to detect infrared light.

One or more radio frequency identification (RFID) readers 124(8), near field communication (NFC) systems, and so forth, may be included as sensors 136. For example, the RFID readers 124(8) may be configured to read the RF tags 1306. Information acquired by the RFID reader 124(8) may be used by the inventory management system 120 to identify an object associated with the RF tag 1306 such as the item 106, the user 112, the tote 1212, and so forth. For example, based on information from the RFID readers 124(8) detecting the RF tag 1306 at different times and RFID readers 124(8) having different locations in the facility 1202, a velocity of the RF tag 1306 may be determined.

One or more RF receivers 124(9) may also be included as sensors 136. In some implementations, the RF receivers 124(9) may be part of transceiver assemblies. The RF receivers 124(9) may be configured to acquire RF signals 1308 associated with Wi-Fi®, Bluetooth®, ZigBee®, 2G, 12G, 13G, LTE, or other wireless data transmission technologies. In some implementations, the RF receivers 124(9) may detect signals transmitted at frequencies such as below 15 MHz. The RF receivers 124(9) may provide information associated with data transmitted via radio frequencies, signal strength of RF signals 1308, and so forth. For example, information from the RF receivers 124(9) may be used by the inventory management system 120 to determine a location of an RF source, such as a communication interface onboard the tote 1212.

The sensors 136 may include one or more accelerometers 124(10), which may be worn or carried by the user 112, mounted to the tote 1212, and so forth. The accelerometers 124(10) may provide information such as the direction and magnitude of an imposed acceleration. Data such as rate of acceleration, determination of changes in direction, speed, and so forth, may be determined using the accelerometers 124(10).

A gyroscope 124(11) may provide information indicative of rotation of an object affixed thereto. For example, the tote 1212 or other objects may be equipped with a gyroscope 124(11) to provide data indicative of a change in orientation of the object.

A magnetometer 124(12) may be used to determine an orientation by measuring ambient magnetic fields, such as the terrestrial magnetic field. The magnetometer 124(12) may be worn or carried by the user 112, mounted to the tote 1212, and so forth. For example, the magnetometer 124(12) mounted to the tote 1212 may act as a compass and provide information indicative of which direction the tote 1212 is oriented.

An optical sensor array 124(13) may comprise one or optical sensors 136(7). The optical sensors 136(7) may be arranged in a regular, repeating, or periodic two-dimensional arrangement such as a grid. The optical sensor array 124(13) may generate image data. For example, the optical sensor array 124(13) may be arranged within or below a fixture 102 and obtain information about shadows of items 106, hand of the user 112, and so forth.

The sensors 136 may include other sensors 136(S) as well. For example, the other sensors 136(S) may include light curtains, ultrasonic rangefinders, thermometers, barometric sensors, hygrometers, and so forth. For example, the inventory management system 120 may use information acquired from thermometers and hygrometers in the facility 1202 to direct the user 112 to check on delicate items 106 stored in a particular fixture 102, which is overheating, too dry, too damp, and so forth.

In one implementation, a light curtain may utilize a linear array of light emitters and a corresponding linear array of light detectors. For example, the light emitters may comprise a line of infrared light emitting diodes (LEDs) or vertical cavity surface emitting lasers (VCSELs) that are arranged above a top fixture 102 in front of the fixture 102, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 110 hand would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand of the user 112 and the sheet of infrared light. In some implementations, a pair of light curtains may be arranged at right angles relative to one another to provide two-dimensional touchpoint data indicative of a position of touch in a plane. Input from the light curtain, such as indicating occlusion from a hand of a user 112 may be used to trigger acquisition or selection of image data for processing by the analysis module 126.

The sensors 136 may also include an instrumented autofacing unit (AFU) 136(14). The instrumented AFU 136(14) may comprise a position sensor configured to provide data indicative of displacement of a pusher. As an item 106 is removed from the AFU, the pusher moves, such as under the influence of a spring, and pushes the remaining items 106 in the AFU to the front of the fixture 102. By using data from the position sensor, and given item data 130 such as a depth of an individual item 106, a count may be determined, based on a change in position data. For example, if each item 106 is 1 inch deep, and the position data indicates a change of 13 inches, the quantity held by the AFU may have changed by 13 items 106. This count information may be used to confirm or provide a cross check for a count obtained by other means, such as analysis of the image data, weight data 122, and so forth.

The sensors 136 may also include the door sensor 114. In some implementations, the other sensors described herein may be used to generate door sensor data 124. For example, the proximity sensor 136(6) mounted on the shelf 104 may generate door sensor data 124 based on the detection of proximity of the door 110. In another example, accelerometer 136(10) may be mounted to the door 110 and is used to generate door sensor data 124 indicative of the motion of the door 110 as the door 110 is opened or closed.

In some implementations, the door sensor 114 may comprise one or more of a switch, a capacitive proximity sensor, an ultrasonic proximity sensor, an optical proximity sensor, a magnetic field sensor such as the magnetometer 136(12) or a magnetic reed switch, an anemometer, a temperature sensor, a potentiometer, a force sensitive resistor, an optical encoder, a camera, and so forth. The magnetic field sensor may be mounted doorframe on the fixture 102 and a magnet be located within the door 110. Detection of the magnetic field produced by the magnet may be used to generate the door sensor data 124. The anemometer may be configured to detect the air movement 116, which is then used to generate the door sensor data 124. The temperature sensor may comprise a thermocouple that detects a change in temperature due to the door 110 being opened or closed, and this change in temperature may then be used to generate door sensor data 124. A potentiometer may be mounted on the hinge mechanism to generate door sensor data 124 that indicates a change in electrical resistance that is indicative of the angle of the door 110 with respect to the fixture 102. The force sensitive resistor may be used to detect the pressure of the door 110 against the doorframe of the fixture 102, or a portion of a hinge mechanism. An optical encoder may comprise an optical target and an optical transmitter and receiver that read the optical target. The optical encoder may be used to determine whether the doors open or closed, in some implementations may be used to indicate the angle at which the door is open. A camera may be used to generate image data that is then processed to determine the configuration of the door 110. In some implementations, a plurality of door sensors 114 may be used simultaneously on the same fixture 102.

In some implementations, the camera 136(1) or other sensors 136(5) may include hardware processors, memory, and other elements configured to perform various functions. For example, the sensor 136(1) may be configured to generate image data, send the image data to another device such as the server 1304, and so forth.

The facility 1202 may include one or more access points 1310 configured to establish one or more wireless networks. The access points 1310 may use Wi-Fi®, NFC, Bluetooth®, or other technologies to establish wireless communications between a device and the network 1302. The wireless networks allow the devices to communicate with one or more of the sensors 136, the inventory management system 120, the optical sensor arrays 124(13), the tag 1306, a communication device of the tote 1212, or other devices.

Output devices 1312 may also be provided in the facility 1202. The output devices 1312 are configured to generate signals, which may be perceived by the user 112 or detected by the sensors 136. In some implementations, the output devices 1312 may be used to provide illumination of the optical sensor array 124(13).

Haptic output devices 1312(1) are configured to provide a signal that results in a tactile sensation to the user 112. The haptic output devices 1312(1) may use one or more mechanisms such as electrical stimulation or mechanical displacement to provide the signal. For example, the haptic output devices 1312(1) may be configured to generate a modulated electrical signal, which produces an apparent tactile sensation in one or more fingers of the user 112. In another example, the haptic output devices 1312(1) may comprise piezoelectric or rotary motor devices configured to provide a vibration, which may be felt by the user 112.

One or more audio output devices 1312(2) may be configured to provide acoustic output. The acoustic output includes one or more of infrasonic sound, audible sound, or ultrasonic sound. The audio output devices 1312(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display devices 1312(3) may be configured to provide output, which may be seen by the user 112 or detected by a light-sensitive sensor such as a camera 136(1) or an optical sensor 136(7). In some implementations, the display devices 1312(3) may be configured to produce output in one or more of infrared, visible, or ultraviolet light. The output may be monochrome or in color. The display devices 1312(3) may be one or more of emissive, reflective, microelectromechanical, and so forth. An emissive display device 1312(3), such as using LEDs, is configured to emit light during operation. In comparison, a reflective display device 1312(3), such as using an electrophoretic element, relies on ambient light to present an image. Backlights or front lights may be used to illuminate non-emissive display devices 1312(3) to provide visibility of the output in conditions where the ambient light levels are low.

The display devices 1312(3) may be located at various points within the facility 1202. For example, the addressable displays may be located on fixtures 102, totes 1212, on the floor of the facility 1202, and so forth.

Other output devices 1312(P) may also be present. For example, the other output devices 1312(P) may include scent/odor dispensers, document printers, 12D printers or fabrication equipment, and so forth.

Figure 14:
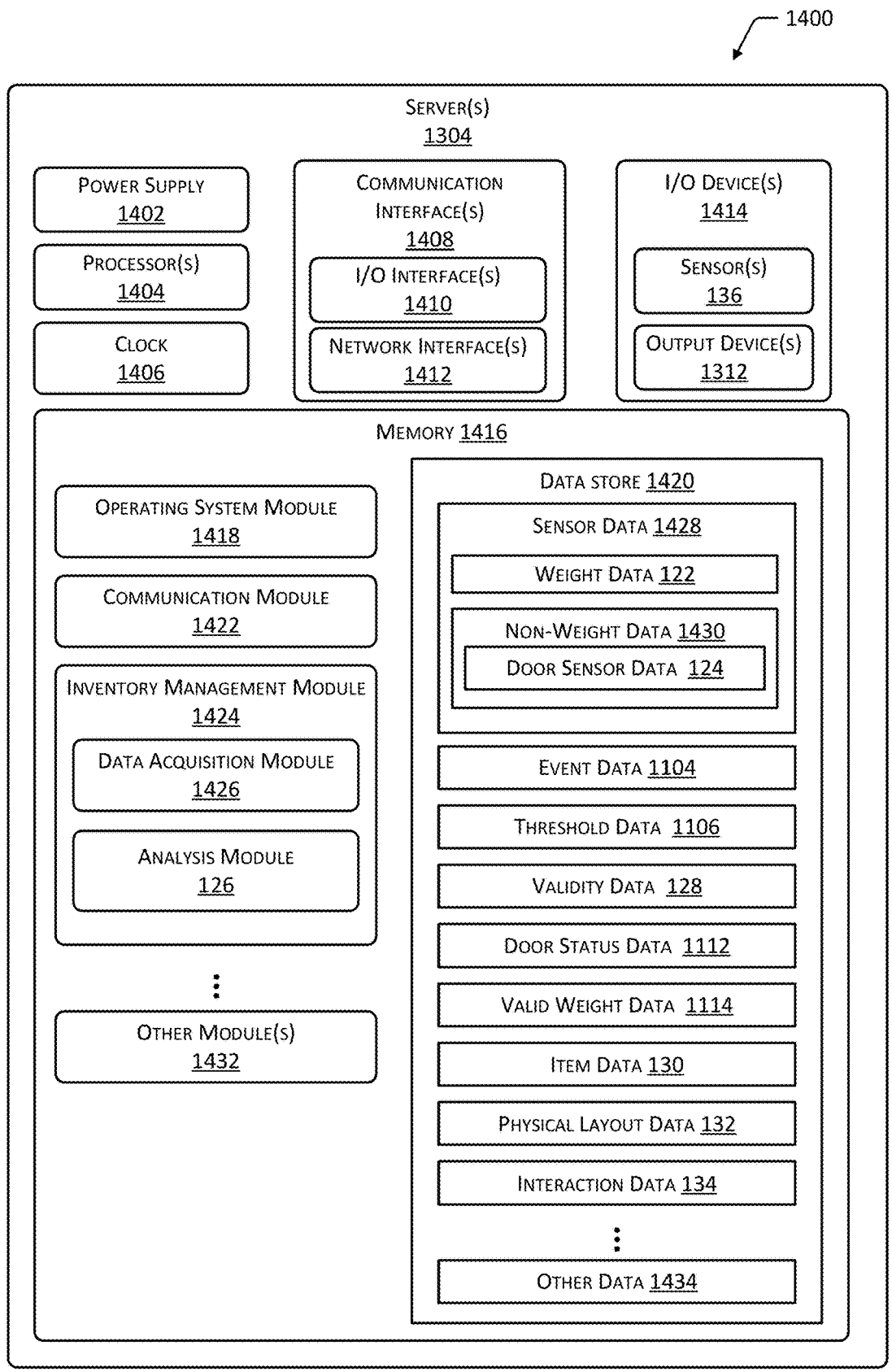
FIG. 14 is a block diagram of a server to support operation of the facility, according to some implementations.

FIG. 14 illustrates a block diagram 1400 of a server 1304 configured to support operation of the facility 1202, according to some implementations. The server 1304 may be physically present at the facility 1202, may be accessible by the network 1302, or a combination of both. The server 1304 does not require end-user knowledge of the physical location and configuration of the system that delivers the services. Common expressions associated with the server 1304 may include "on-demand computing", "software as a service (SaaS)", "platform computing", "network-accessible platform", "cloud services", "data centers", and so forth. Services provided by the server 1304 may be distributed across one or more physical or virtual devices.

One or more power supplies 1402 may be configured to provide electrical power suitable for operating the components in the server 1304. The one or more power supplies 1402 may comprise batteries, capacitors, fuel cells, photovoltaic cells, wireless power receivers, conductive couplings suitable for attachment to an external power source such as provided by an electric utility, and so forth. The server 1304 may include one or more hardware processors 1404 (processors) configured to execute one or more stored instructions. The processors 1404 may comprise one or more cores. One or more clocks 1406 may provide information indicative of date, time, ticks, and so forth. For example, the processor 1404 may use data from the clock 1406 to associate a particular interaction with a particular point in time.

The server 1304 may include one or more communication interfaces 1408 such as input/output (I/O) interfaces 1410, network interfaces 1412, and so forth. The communication interfaces 1408 enable the server 1304, or components thereof, to communicate with other devices or components. The communication interfaces 1408 may include one or more I/O interfaces 1410. The I/O interfaces 1410 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1410 may couple to one or more I/O devices 1414. The I/O devices 1414 may include input devices such as one or more of a sensor 136, keyboard, mouse, scanner, and so forth. The I/O devices 1414 may also include output devices 1312 such as one or more of a display device 1312(3), printer, audio speakers, and so forth. In some embodiments, the I/O devices 1414 may be physically incorporated with the server 1304 or may be externally placed.

The network interfaces 1412 may be configured to provide communications between the server 1304 and other devices, such as the totes 1212, routers, access points 1310, and so forth. The network interfaces 1412 may include devices configured to couple to personal area networks (PANs), local area networks (LANs), wireless local area networks (WLANS), wide area networks (WANs), and so forth. For example, the network interfaces 1412 may include devices compatible with Ethernet, Wi-Fi®, Bluetooth®, ZigBee®, and so forth.

The server 1304 may also include one or more busses or other internal communications hardware or software that allow for the transfer of data between the various modules and components of the server 1304.

As shown in FIG. 14, the server 1304 includes one or more memories 1416. The memory 1416 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1416 provides storage of computer-readable instructions, data structures, program modules, and other data for the operation of the server 1304. A few example functional modules are shown stored in the memory 1416, although the same functionality may alternatively be implemented in hardware, firmware, or as a system on a chip (SoC).

The memory 1416 may include at least one operating system (OS) module 1418. The OS module 1418 is configured to manage hardware resource devices such as the I/O interfaces 1410, the I/O devices 1414, the communication interfaces 1408, and provide various services to applications or modules executing on the processors 1404. The OS module 1418 may implement a variant of the FreeBSD™ operating system as promulgated by the FreeBSD Project; other UNIX™ or UNIX-like variants; a variation of the Linux™ operating system as promulgated by Linus Torvalds; the Windows® operating system from Microsoft Corporation of Redmond, Wash., USA; and so forth.

Also stored in the memory 1416 may be a data store 1420 and one or more of the following modules. These modules may be executed as foreground applications, background tasks, daemons, and so forth. The data store 1420 may use a flat file, database, linked list, tree, executable code, script, or other data structure to store information. In some implementations, the data store 1420 or a portion of the data store 1420 may be distributed across one or more other devices including the servers 1304, network attached storage devices, and so forth.

A communication module 1422 may be configured to establish communications with one or more of the totes 1212, sensors 136, display devices 1312(3), other servers 1304, or other devices. The communications may be authenticated, encrypted, and so forth.

The memory 1416 may store an inventory management module 1424. The inventory management module 1424 is configured to provide the inventory functions as described herein with regard to the inventory management system 120. For example, the inventory management module 1424 may track items 106 between different fixtures 102, to and from the totes 1212, and so forth. The inventory management module 1424 may access sensor data 1428. The sensor data 1428 may include weight data 122, non-weight data 1430, and so forth. The non-weight data 1430 may include the door sensor data 124, data obtained from other sensors such as cameras 136(1), depth sensors 136(2), and so forth.

The data store 1420 may store other data such as the event data 1104, threshold data 1106, validity data 128, door status data 1112, valid weight data 114, item data 130, physical layout data 132, interaction data 134, and so forth.

The inventory management module 1424 may include one or more of a data acquisition module 1426 and the analysis module 126. The data acquisition module 1426 may be configured to acquire and access information associated with operation of the facility 1202. For example, the data acquisition module 1426 may be configured to acquire sensor data 1428, such as the weight data 122, the non-weight data 1430 such as the image data, and so forth.

The analysis module 126 may operate as described above, and is configured to determine the validity data 128 and generate interaction data 134 using the valid weight data 1114. The analysis module 126 may process other non-weight data 1430, such as the image data.

Processing of image data may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the image data. In still another implementation, functions such as those in the Machine Vision Toolbox for Matlab (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 1428 or other data. For example, the ANN may be a trained using a supervised learning algorithm such that object identifiers are associated with images of particular objects within training images provided to the ANN. Once trained, the ANN may be provided with the sensor data 1428 to determination of similarity between two or more images, provide object identification, and so forth.

Other modules 1432 may also be present in the memory 1416 as well as other data 1434 in the data store 1420. For example, the other modules 1432 may include an accounting module while the other data 1434 may include billing data. The accounting module may be configured to assess charges to accounts associated with particular users 112 or other entities, while the billing data may include information such as payment account numbers.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:
1. A system comprising:
a fixture comprising:
   an insulated enclosure;
   a shelf within the insulated enclosure;
   a first door configured to provide access to the shelf within the insulated enclosure;
   a second door near the first door;
   a refrigeration unit configured to cool an interior of the insulated enclosure;
   a spring-loaded switch configured to generate first door sensor data indicative of whether the first door is open or closed;
   a second sensor to generate second door sensor data indicative of whether the second door is in an open state, a closed state, or transitioning between the open state and the closed state; and
   a load cell configured to measure weight of a load on the shelf and generate weight data; and
a computing device comprising:
   a memory storing first computer-executable instructions; and
   a hardware processor to execute the first computer-executable instructions to:
      access the first door sensor data;
      determine, using the first door sensor data, first door status data indicative of the first door transitioning from a closed state at a first time to an open state at a second time;
      access the second door sensor data;
      determine, using the second door sensor data, second door status data indicative of a configuration of the second door at one or more of the first time or the second time;
      determine, using the first door status data and the second door status data, that first weight data which corresponds to a time between the first time and the second time is invalid;

determine, using the first door status data and the second door status data, that second weight data which corresponds to a time that is after the second time is valid;

generate interaction data using the second weight data; and update a quantity of a type of item at the shelf using the interaction data.

2. A system comprising:
a fixture comprising:
 a shelf;
 a first door configured to provide access to the shelf;
 one or more first sensors to generate first sensor data indicative of a state of the first door;
 a second door;
 one or more second sensors to generate second sensor data indicative of a state of the second door; and
 at least one load cell configured to measure weight of a load on the shelf and generate weight data; and
a computing device comprising:
 a memory storing first computer-executable instructions; and
 a hardware processor to execute the first computer-executable instructions to:
  process the first sensor data to determine first door status data at a particular time;
  process the second sensor data to determine second door status data at the particular time; and
  determine, using the first door status data and the second door status data, validity of the weight data obtained at the particular time.

3. The system of claim 2, the fixture further comprising:
a communication interface;
the memory storing second computer-executable instructions; and
the hardware processor to execute the second computer-executable instructions to:
 replace one or more bits of the weight data with the first sensor data to generate multiplexed data; and
 transmit, using the communication interface, the multiplexed data.

4. The system of claim 2, wherein:
the second door is near the first door.

5. The system of claim 2, the fixture further comprising:
an enclosure with the shelf therein; and
one or more heating devices to heat an interior of the enclosure.

6. The system of claim 2, the fixture further comprising:
an enclosure with the shelf therein; and
a refrigeration mechanism configured to cool an interior of the enclosure.

7. The system of claim 2, the computing device further comprising a communication interface;
the memory storing second computer-executable instructions; and
the hardware processor to execute the second computer-executable instructions to:
 determine the weight data obtained at the particular time is valid; and
 send, using the communication interface, the weight data obtained at the particular time that is valid.

8. The system of claim 2, further comprising the memory storing second computer-executable instructions; and
the hardware processor to execute the second computer-executable instructions to:
 designate the weight data obtained at the particular time as invalid.

9. The system of claim 2, further comprising:
the memory storing second computer-executable instructions; and
the hardware processor to execute the second computer-executable instructions to:
 determine a value indicative of how far open the first door is exceeds a threshold value; and
 designate the weight data obtained at the particular time as valid.

10. The system of claim 2, wherein:
the one or more first sensors comprising one or more of a pressure sensor that detects pressure from contact of a hand, a proximity sensor that detects a presence of the hand, or a touch sensor that detects contact of the hand; and
at least one of the one or more first sensors is proximate to or at least partially within a handle of the first door and is configured to generate the first sensor data that is indicative of use of the handle.

11. The system of claim 2, wherein one of the one or more first sensors comprises a camera having a field of view that includes at least a portion of the first door and the first sensor data comprises one or more images acquired by the camera; and
the memory storing second computer-executable instructions; and
the hardware processor to execute the second computer-executable instructions to:
 process the one or more images to determine a position of the first door.

12. The system of claim 2, wherein the one or more first sensors comprise one or more of:
 a switch,
 a capacitive proximity sensor,
 an ultrasonic proximity sensor,
 an optical proximity sensor,
 a magnetic field sensor,
 an anemometer,
 a temperature sensor,
 a potentiometer,
 a force sensitive resistor,
 an optical encoder, or
 a camera.

13. The system of claim 2, wherein the one or more first sensors are mounted to a front edge of one or more of the shelf or a structure supporting the shelf, further wherein the front edge is proximate to the first door.

14. A method comprising:
generating weight data using one or more load cells at a fixture that comprises a shelf and a first door;
accessing first sensor data indicative of a state of the first door;
accessing second sensor data indicative of a state of a second door;
determining, using the first sensor data, first door status data indicative of a configuration of the first door at a particular time;
determining, using the second sensor data, second door status data indicative of a configuration of the second door at the particular time; and
determining, using the first door status data and the second door status data, validity of the weight data obtained at the particular time.

15. The method of claim 14, further comprising:
determining a first time at which the configuration of the first door changes between an open configuration and a closed configuration;
determining a portion of the weight data that occurred between a second time and a third time, wherein the first time is between the second time and the third time; and
designating the portion of the weight data as being invalid.

16. The method of claim 14, further comprising:
determining a first time at which the configuration of the first door changes from an open configuration to a closed configuration;
determining a portion of the weight data that occurred between a second time and the first time, wherein the second time is before the first time; and
designating the portion of the weight data as being invalid.

17. The method of claim 14, further comprising:
determining the weight data obtained at the particular time is invalid when the first door is closed and the second door has changed between a closed configuration and an open configuration.

18. The method of claim 14, further comprising:
determining the weight data obtained at the particular time is valid; and
sending the weight data obtained at the particular time that is valid to a computing device.

19. The method of claim 14, further comprising:
determining the weight data obtained at the particular time is valid; and
determining a weight value of a load at the fixture using the weight data obtained at the particular time.

20. The method of claim 14, further comprising:
determining the weight data obtained at the particular time is invalid; and
determining a weight value of a load at the fixture using the weight data obtained at the particular time, the determining the weight value of the load comprising one or more of:
applying a filter to the weight data obtained at the particular time, or
assigning a low confidence value to the weight value.

* * * * *